US009639867B2

(12) United States Patent
Folkens et al.

(10) Patent No.: US 9,639,867 B2
(45) Date of Patent: May 2, 2017

(54) IMAGE PROCESSING SYSTEM INCLUDING IMAGE PRIORITY

(71) Applicant: IMAGE SEARCHER, INC., Los Angeles, CA (US)

(72) Inventors: Bradford A. Folkens, Los Angeles, CA (US); Dominik K. Mazur, Los Angeles, CA (US)

(73) Assignee: Cloudsight, Inc., Los Angeles, CA (US)

( * ) Notice: Subject to any disclaimer, the term of this patent is extended or adjusted under 35 U.S.C. 154(b) by 0 days.

(21) Appl. No.: 14/592,816

(22) Filed: Jan. 8, 2015

(65) Prior Publication Data

US 2015/0220567 A1    Aug. 6, 2015

Related U.S. Application Data

(63) Continuation-in-part of application No. 14/267,840, filed on May 1, 2014.

(60) Provisional application No. 61/956,927, filed on May 1, 2013, provisional application No. 61/975,691, filed on Apr. 4, 2014, provisional application No. 61/976,494, filed on Apr. 7, 2014, provisional application No. 61/987,156, filed on May 1, 2014, provisional application No. 62/031,397, filed on Jul. 31, 2014, provisional application No. 62/069,160, filed on Oct. 27, 2014, provisional application No. 62/084,509, filed on Nov. 25, 2014.

(51) Int. Cl.
| G06K 9/46 | (2006.01) |
| G06Q 30/02 | (2012.01) |
| G06K 9/62 | (2006.01) |
| G06F 17/30 | (2006.01) |

(52) U.S. Cl.
CPC ... *G06Q 30/0277* (2013.01); *G06F 17/30268* (2013.01); *G06K 9/6263* (2013.01); *G06K 2209/25* (2013.01)

(58) Field of Classification Search
CPC ............ G06K 9/00684; G06K 9/6201; G06K 9/00979; G06Q 30/0251; G06F 17/30253
USPC .................................................. 382/181, 203
See application file for complete search history.

(56) References Cited

U.S. PATENT DOCUMENTS

| 7,110,026 B2 | 9/2006 | Feldis, III |
| 7,194,148 B2 | 3/2007 | Yavitz |
| 7,707,239 B2 | 4/2010 | Anderson et al. |
| 7,945,653 B2 | 5/2011 | Zuckerberg et al. |

(Continued)

OTHER PUBLICATIONS

U.S. Appl. No. 14/267,840, filed May 1, 2014, Bradford Folkens, Image Processing.

(Continued)

*Primary Examiner* — Ruiping Li
(74) *Attorney, Agent, or Firm* — Royse Law Firm, PC

(57) ABSTRACT

An image recognition approach employs both computer generated and manual image reviews to generate image tags characterizing an image. The computer generated and manual image reviews can be performed sequentially or in parallel. The generated image tags may be provided to a requester in real-time, be used to select an advertisement, and/or be used as the basis of an internet search. In some embodiments generated image tags are used as a basis for an upgraded image review. A confidence of a computer generated image review may be used to determine whether or not to perform a manual image review.

18 Claims, 8 Drawing Sheets

(56) References Cited

U.S. PATENT DOCUMENTS

| | | | |
|---|---|---|---|
| 8,645,287 | B2 | 2/2014 | Baker et al. |
| 8,712,158 | B2 | 4/2014 | Bharath et al. |
| 8,718,321 | B2 | 5/2014 | Bharath |
| 8,788,493 | B2 | 7/2014 | Stallings et al. |
| 8,825,744 | B2 | 9/2014 | Wang |
| 8,867,779 | B2 | 10/2014 | Anbalagan et al. |
| 8,935,204 | B2 | 1/2015 | Peto et al. |
| 9,218,364 | B1* | 12/2015 | Garrigues ......... G06F 17/30244 |
| 2009/0027337 | A1 | 1/2009 | Hildreth |
| 2009/0083332 | A1 | 3/2009 | Datta et al. |
| 2009/0324022 | A1 | 12/2009 | Sangberg et al. |
| 2010/0076976 | A1 | 3/2010 | Sotirov et al. |
| 2011/0044512 | A1 | 2/2011 | Bambha et al. |
| 2011/0099064 | A1 | 4/2011 | Lyon et al. |
| 2012/0151398 | A1 | 6/2012 | Foy et al. |
| 2012/0284122 | A1 | 11/2012 | Brandis |
| 2013/0121571 | A1 | 5/2013 | Gokturk |
| 2013/0346068 | A1 | 12/2013 | Solem |
| 2014/0129981 | A1 | 5/2014 | Soderberg |
| 2014/0164927 | A1 | 6/2014 | Salaverry et al. |
| 2014/0379730 | A1 | 12/2014 | Liu et al. |
| 2016/0125270 | A1* | 5/2016 | Gokturk ............ G06F 17/30253 382/118 |

OTHER PUBLICATIONS

U.S. Appl. No. 14/592,555, filed Jan. 8, 2015, Bradford Folkens, Image Processing Methods.

U.S. Appl. No. 14/592,709, filed Jan. 8, 2015, Dominik Mazur, Image Processing Including Object Selection.

U.S. Appl. No. 14/592,764, filed Jan. 8, 2015, Bradford Folkens, Image Processing Client.

U.S. Appl. No. 14/592,797, filed Jan. 8, 2015, Dominik Mazur, Image Processing Server.

U.S. Appl. No. 14/592,882, filed Jan. 8, 2015, Dominik Mazur, Image Tagging System.

U.S. Appl. No. 14/592,885, filed Jan. 8, 2015, Bradford Folkens, Priority Based Image Processing Methods.

U.S. Appl. No. 14/267,840 Non-Final Rejection, issued Apr. 8, 2016, 18 pages.

U.S. Appl. No. 14/267,840 Amendment A, Response to Non-Final Rejection, filed Jul. 8, 2016, 17 pages.

U.S. Appl. No. 14/592,555 Non-Final Rejection, issued Feb. 18, 2016, 21 pages.

U.S. Appl. No. 14/592,555 Amendment A, Response to Non-Final Rejection, filed Jun. 20, 2016, 18 pages.

U.S. Appl. No. 14/592,709 Non-Final Rejection, issued Jun. 2, 2016, 18 pages.

Renn, et al., Automatic Image Tagging Using Community-driven Online Image Databases, AMR. 2008.

U.S. Appl. No. 14/592,764 Non-Final Rejection, issued Mar. 7, 2016, 19 pages.

U.S. Appl. No. 14/592,764 Amendment A, Response to Non-Final Rejection, filed Jun. 7, 2016, 13 pages.

U.S. Appl. No. 14/592,764 Final Rejection, issued Jul. 8, 2016, 26 pages.

U.S. Appl. No. 14/267,840 Final Rejection, issued Oct. 21, 2016, 11 pages.

U.S. Appl. No. 14/592,709 Amendment A, Response to Non-Final Rejection, issued Oct. 3, 2016, 15 pages.

* cited by examiner

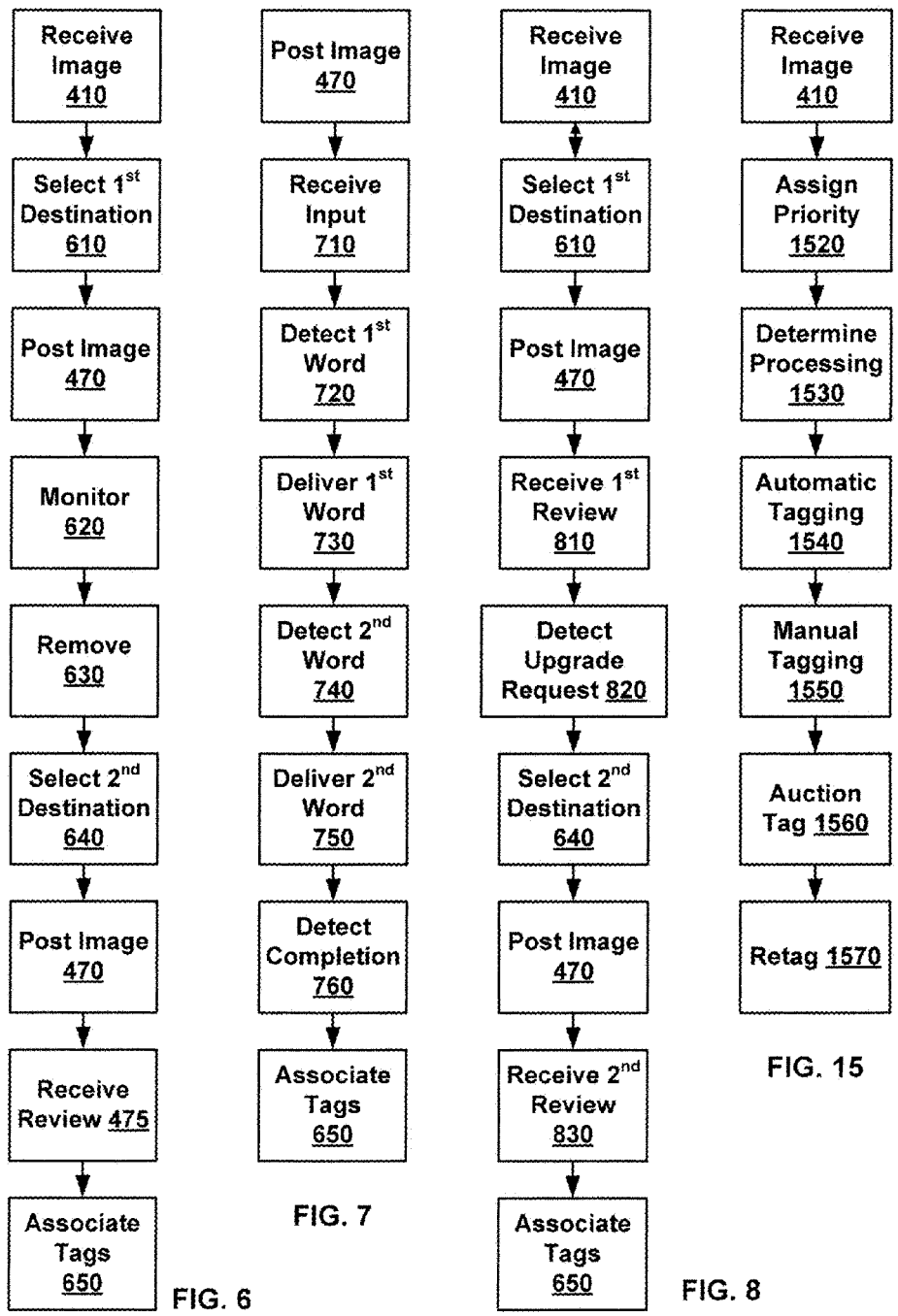

IMAGE PROCESSING SYSTEM INCLUDING IMAGE PRIORITY

CROSS-REFERENCE TO RELATED APPLICATIONS

This application is a continuation-in-part of U.S. nonprovisional application entitled "Image Processing," filed May 1, 2014 and having Ser. No. 14/267,840 which, in turn, claimed priority to provisional application 61/956,927 filed May 1, 2013; this application further claims priority to and benefit of the following U.S. Provisional Patent Applications:

"Visual Search," filed Apr. 4, 2014 and having Ser. No. 61/975,691;

"Visual Search Advertising," filed Apr. 7, 2014 and having Ser. No. 61/976,494;

"Image Processing," filed May 1, 2014 and having Ser. No. 61/987,156;

"Real-time Target Selection in Image Processing" filed Jul. 31, 2014 and having Ser. No. 62/031,397;

"Distributed Image Processing" filed Oct. 27, 2014 having Ser. No. 62/069,160; and "Selective Image Processing" filed Nov. 25, 2014 having Ser. No. 62/084,509.

All the above patent applications are hereby incorporated herein by reference.

BACKGROUND

Field of the Invention

The invention is in the field of image processing, and more particularly in the field of characterizing content of images.

Related Art

It is typically more difficult to extract information from images as compared to text data. However, a significant fraction of information is found in images. The reliability of automated image recognition systems is highly dependent on the contents of an image. For example, optical character recognition is more reliable than facial recognition. It is a goal of image recognition to tag an image. Tagging refers to the identification of tags (words) that characterize the content of an image. For example an image of a car may be tagged with the words "car," "Ford Granada," or "White 1976 Ford Granada with broken headlight." These tags include varying amounts of information and, as such, may vary in usefulness.

SUMMARY

Embodiments of the invention include a two pronged approach to tagging of images. The first prong is to perform automated image recognition on an image. The automated image recognition results in a review of the image. The image review includes one or more tags identifying contents of the image and optionally also a measure of confidence representative of the reliability of the automated image recognition. The second prong in the approach to tagging of images includes a manual tagging of the image. Manual tagging includes a person viewing each image, considering the content of the image, and manually providing tags representative of the content of the image. Automated image recognition has an advantage in that the cost, in time or money, of analyzing each image can be relatively low. Manual tagging of images has an advantage of higher accuracy and reliability.

Embodiments of the invention combine both automated image recognition and manual image recognition. In some embodiments automated image recognition is performed first. The resulting image review typically includes both one or more tags characterizing the image and a measure of confidence in the accuracy of these tags. If the confidence is above a predetermined threshold, then these tags are associated with the image and provided as an output of the tagging process. If the confidence is below the predetermined threshold, then a manual review of the image is performed. The manual review results in additional and/or different tags that characterize the contents of the image. In some embodiments, the automated image recognition and the manual review of the image are performed in parallel. The manual review is optionally cancelled or aborted if the automated image recognition results in one or more tags having a confidence above the predetermined threshold.

In some embodiments recognition of an image can be upgraded. Upgrading of the image recognition process includes a request for further or improved tags representative of the content of the image. For example, if automated image recognition results in the tags "white car," an upgrade of this recognition may result in the tags "white Ford Granada." In some embodiments, an upgraded review makes use of an expert human reviewer. For example, the above example may include the use of a human reviewer with an expert knowledge of automobiles. Other examples of reviewer expertise are discussed elsewhere herein.

Various embodiments of the invention include features directed toward improving the accuracy of image recognition while also minimizing cost. By way of example, these features include efficient use of human reviewers, real-time delivery of image tags, and/or seamless upgrades of image recognition. The approaches to image recognition disclosed herein are optionally used to generate image tags suitable for performing internet searches and/or selecting advertisements. For example, in some embodiments, image tags are automatically used to perform a Google search and/or sell advertising based on Google's AdWords.

Various embodiments of the invention include an image processing system comprising an I/O configured to communicate an image and image tags over a communication network; an automatic identification interface configured to communicate the image to an automatic identification system and to receive a computer generated review of the image from the automatic identification system, the computer generated review including one or more image tags identifying contents of the image; destination logic configured to determine a first destination to send the image to, for a first manual review of the image by a first human reviewer; image posting logic configured to post the image to the destination; review logic configured to receive the a manual review of the image from the destination and to receive the computer generated review, the manual review including one or more image tags identifying contents of the image; response logic configured to provide the image tags of the computer generated review and the image tags of the manual review to the communication network; memory configured to store the image; and a microprocessor configured to execute at least the destination logic.

Various embodiments of the invention include a method of processing an image, the method comprising receiving an image from an image source; distributing the image to an automated image identification system; receiving a computer generated review from the automated image identification system, the computer generated review including one or more image tags assigned to the image by the automated image identification system and a measure of confidence, the measure of confidence being a measure of confidence that the image tags assigned to the image correctly characterize contents of the image; placing the image in an image queue; determining a destination; posting the image for manual review to a first destination, the first destination including a display device of a human image reviewer; and receiving a manual image review of the image from the destination, the image review including one or more image tags assigned to the image by the human image reviewer, the one or more image tags characterizing contents of the image.

Various embodiments of the invention include an image source comprising a camera configure to capture an image; a display configured to present the image to a user; eye tracking logic configured to detect an action of one or more eyes of the user; optional image marking logic configured to place a mark on the image, the mark being configured to indicate a particular subset of the image and being responsive to the detected action; display logic configured to display the mark on the image in real time; an I/O configured to provide the image a computer network; and a processor configured to execute at least the display logic.

Various embodiments of the invention include an image source comprising a camera configure to capture an image; a display configured to present the image to a user; eye tracking logic configured to detect an action of one or more eyes of the user; image marking logic configured for a user to indicate a particular subset of the image and to highlight an object within the subset, the indication being responsive to the detected action; display logic configured to display the highlighted on the image in real time; an I/O configured to provide the image and the indication of the particular subset to a computer network; and a processor configured to execute at least the display logic.

Various embodiments of the invention include an image source comprising a camera configure to capture an image; a display configured to present the image to a user; selection logic configured for selecting; image marking logic configured for a user to indicate a particular subset of the image and to highlight an object within the subset, the indication being responsive to the detected finger; an I/O configured to provide the image and the indication of the particular subset to a computer network; display logic configured to display the image in real time and to display image tags received from the computer network in response to the image, the image tags characterizing contents of the image; and a processor configured to execute at least the display logic.

Various embodiments of the invention include an image processing system comprising an I/O configured to communicate an image sequence and image tags over a communication network; optional an automatic identification interface configured to communicate the image sequence to an automatic identification system and to receive a computer generated review of the image from the automatic identification system, the computer generated review including one or more image tags identifying contents of the image; destination logic configured to determine a first destination to send the image sequence to, for a first manual review of the image sequence by a first human reviewer; image posting logic configured to post the image sequence to the destination; review logic configured to receive the a manual review of the image sequence from the destination and optionally to receive the computer generated review, the manual review including one or more image tags identifying an action within of the image sequence; response logic configured to provide the image tags of the manual review to the communication network; memory configured to store the image sequence; and a microprocessor configured to execute at least the destination logic.

Various embodiments of the invention include a method of processing an image, the method comprising: receiving one or more first descriptors of an image at an image processing server, from a remote client via a communication network; comparing the received first descriptors to second descriptors stored locally to the image processing server, to determine if the first descriptors match a set of the second descriptors; responsive to the first descriptors matching the set of second descriptors, retrieving one or more image tags stored in association with the set of second descriptors; and providing the one or more image tags to the client.

Various embodiments of the invention include a method of processing an image at an image processing server, the method comprising: receiving an image and data characterizing the image from a remote client; determining a destination for the image, the destination being associated with a human image reviewer, the determination of the destination being based on a match between the data characterizing the image and a specialty of the human reviewer; posting the image to the determined destination; receiving one or more image tags characterizing the image, from the destination; and providing the one or more image tags to the client.

Various embodiments of the invention include a method of processing an image, the method comprising: receiving data characterizing the image from a mobile device, the data characterizing the image including identified features of an image or descriptors of an image; generating image tags based on the data characterizing the image; providing the image tags to the mobile device.

Various embodiments of the invention include a method of processing an image, the method comprising: receiving an image using a portable device; identifying features of the image using a processor of the portable device; providing the features to a remote image processing server via a communication network; receiving image tags based on the features from the image processing server; and displaying the image tags on a display of the portable device.

Various embodiments of the invention include a method of processing an image, the method comprising: receiving an image using a portable device; identifying features of the image using a processor of the portable device; deriving image descriptors based on the identified features; providing the descriptors to a remote image processing server via a communication network; receiving image tags based on the descriptors from the image processing server; and displaying the image tags on a display of the portable device.

Various embodiments of the invention include a method of processing an image, the method comprising: receiving an image using a portable device; identifying features of the image using a processor of the portable device; deriving image descriptors based on the identified features; comparing the image descriptors with a set of image descriptors previously stored on the portable device to determine if there is a match between the image descriptors and the stored set of image descriptors; if there is a match between the image descriptors and the stored set of image descriptors retrieving one or more image tags associated with the set of image descriptors from memory of the portable device; displaying the retrieved one or more image tags on a display of the portable device.

Various embodiments of the invention include a method of processing an image, the method comprising: receiving an image using a portable device; identifying features of the image using a processor of the portable device; deriving image descriptors based on the identified features; comparing the image descriptors with a set of image descriptors previously stored on the portable device to determine if there is a match between the image descriptors and the stored set of image descriptors; classifying the image based on the match between the image descriptors and the stored set of image descriptors; sending the image and the classification of the image to a remote image processing server; receiving one or more image tags based on the image; and displaying the one or more image tags on a display of the portable device.

Various embodiments of the invention include an image processing system comprising an I/O configured to communicate an image and image tags over a communication network; an image ranker configured to determine a priority for tagging the image; destination logic configured to determine a first destination to send the image to, for a first manual review of the image by a first human reviewer; image posting logic configured to post the image to the destination; review logic configured to receive the a manual review of the image from the destination, the manual review including one or more image tags identifying contents of the image; memory configured to store the one or more image tags in a data structure; and a microprocessor configured to execute at least the image ranker.

Various embodiments of the invention include an image processing system comprising an I/O configured to receive an image over a communication network; an image ranker configured to determine a priority of the image and to determine whether or not to tag the image based on the priority and/or how to tag the image; manual or automatic means for tagging the image to produce one or more image tags characterizing the image; memory configured to store the image and the one or more image tags characterizing the image, in a data structure; and a microprocessor configured to execute at least the image ranker.

Various embodiments of the invention include an image processing system comprising an I/O configured to receive an image over a communication network; an image ranker configured to determine a priority of the image and to select a process of tagging the image based on the priority; means for tagging the image to produce one or more image tags characterizing the image; memory configured to store the image and the one or more image tags characterizing the image, in a data structure; and a microprocessor configured to execute at least the image ranker.

Various embodiments of the invention include an image processing system comprising an I/O configured to communicate an image and image tags over a communication network; an image ranker configured to determine a priority for tagging the image based on how many times a video including the image is viewed; destination logic configured to determine a destination to send the image to, for a manual review of the image by a human reviewer; image posting logic configured to post the image to the destination; review logic configured to receive the manual review of the image from the destination, the manual review including one or more image tags identifying contents of the image; memory configured to store the one or more image tags in a data structure; and a microprocessor configured to execute at least the image ranker.

Various embodiments of the invention include an method of processing an image, the method comprising receiving an image from an image source; distributing the image to an automated image identification system; receiving a computer generated review from the automated image identification system, the computer generated review including one or more image tags assigned to the image by the automated image identification system and a measure of confidence, the measure of confidence being a measure of confidence that the image tags assigned to the image correctly characterize contents of the image; assigning a priority to the image based on the measure of confidence; determining that the image should be manually tagged based on the priority; posting the image for manual review to a first destination, the first destination including a display device of a human image reviewer; and receiving a manual image review of the image from the destination, the image review including one or more image tags assigned to the image by the human image reviewer, the one or more image tags assigned by the human image reviewer characterizing contents of the image.

Various embodiments of the invention include an method of processing an image, the method comprising receiving an image from an image source; automatically determining a priority to the image using a microprocessor; determining how the image should be tagged based on the priority; tagging the image to produce one or more tags, the one or more tags characterizing contents of the image; and storing the image and the one or more tags in a data structure.

BRIEF DESCRIPTION OF THE DRAWINGS

FIG. 6 illustrates methods of managing a reviewer pool, according to various embodiments of the invention.

FIG. 7 illustrates methods of receiving image tags in real-time, according to various embodiments of the invention.

FIG. 8 illustrates methods of upgrading an image review, according to various embodiments of the invention.

FIG. 15 illustrates methods of prioritizing image tagging, according to various embodiments of the invention.

DETAILED DESCRIPTION

Figure 1:
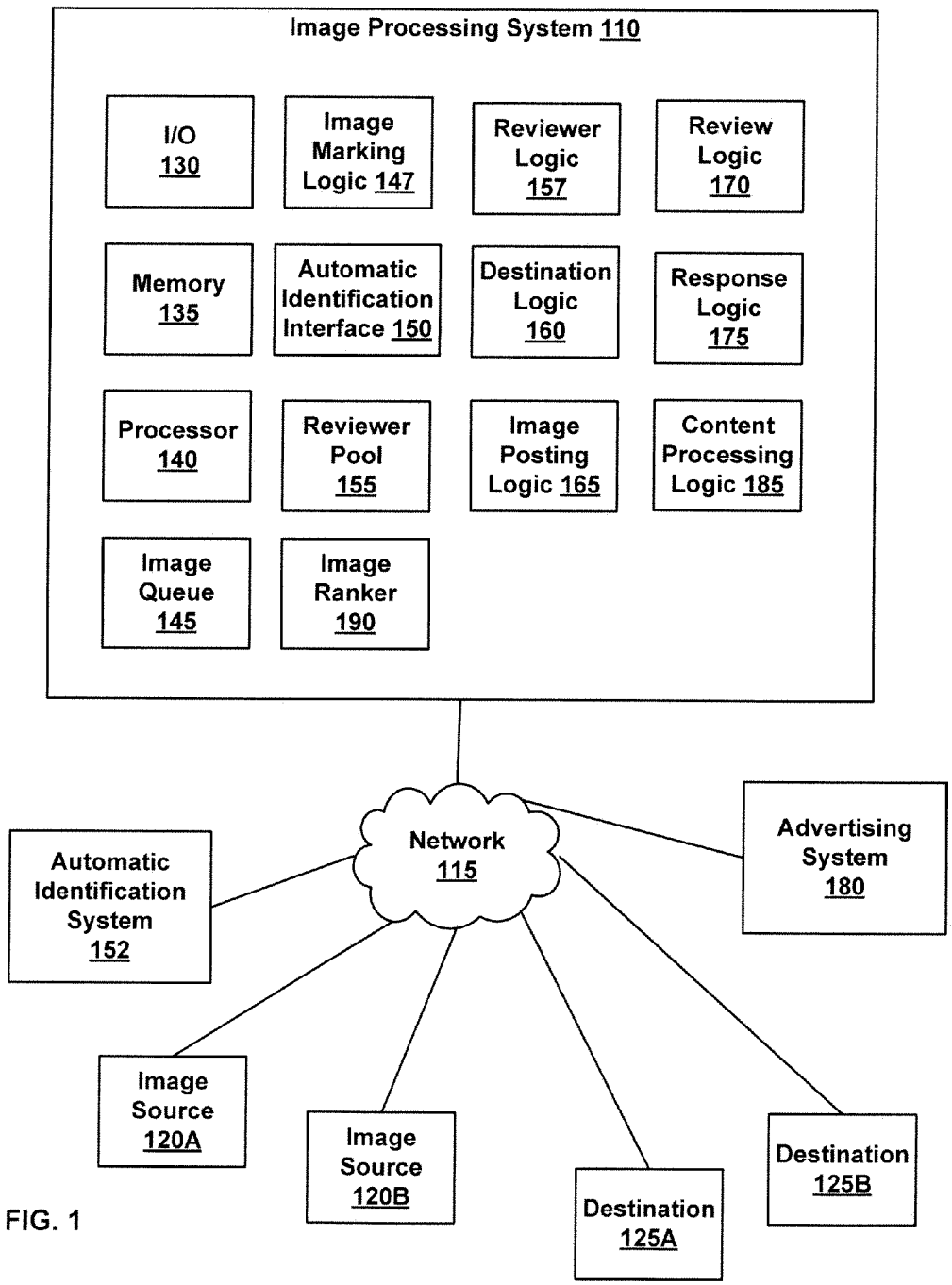
FIG. 1 illustrates an image processing system, according to various embodiments of the invention.

FIG. 1 illustrates an Image Processing System 110, according to various embodiments of the invention. Image Processing System 110 is configured for tagging of images and may include one or more distributed computing devices. For example, Image Processing System 110 may include one or more servers located at geographically different places.

Image Processing System 110 is configured to communicate via a Network 115. Network 115 can include a wide variety of communication networks, such as the internet and/or a cellular telephone system. Network 115 is typically configured to communicate data using standard protocols such as IP/TCP, FTP, etc. The images processed by Image Processing System 110 are received from Image Sources 120 (individually labeled 120A, 120B, etc.). Image Sources 120 can include computing resources connected to the internet and/or personal mobile computing devices. For example Image Source 120A may be a web server configured to provide a social networking website or a photo sharing service. Image Source 120B may be a smart phone, camera, a wearable camera, electronic glasses or other portable image capture device. Image sources may be identified by a universal resource locator, an internet protocol address, a MAC address, a cellular telephone identifier, and/or the like. In some embodiments Image Processing System 110 is configured to receive images from a large number of Image Sources 120.

Part of the image tagging performed by Image Processing System 110 includes sending images to Destinations 125 (individually labeled 125A, 125B, etc.). Destinations 125 are computing devices of human image reviewers and are typically geographically remote from Image Processing System 110. Destinations 125 include at least a display and data entry devices such as a touch screen, keyboard and/or microphone. For example, Destinations 125 may be in a different building, city, state and/or country than Image Processing System 110. Destinations 125 may include personal computers, computing tablets, smartphones, etc. In some embodiments, Destinations 125 include a (computing) application specifically configured to facilitate review of images. This application is optionally provided to Destinations 125 from Image Processing System 110. In some embodiments, Image Processing System 110 is configured for human image reviewers to log into a user account from Destinations 125. Destinations 125 are typically associated with an individual reviewer and may be identified by an internet protocol address, a MAC address, a login session identifier, cellular telephone identifier, and/or the like. In some embodiments, Destinations 125 include an audio to text converter. Image tagging data provided by a human image reviewer at a member of Destinations 125 is sent to Image Processing System 110. The image tagging data can include textual image tags, audio data including verbalized tags, and/or non-tag information such as upgrade requests or inappropriate (explicit) material designations.

Image Processing System 110 includes an I/O (input/output) 130 configured for communicating with external systems. I/O 130 can include routers, switches, modems, firewalls, and/or the like. I/O 130 is configured to receive images from Image Sources 120, to send the images to Destinations 125, to receive tagging data from Destinations 125, and optionally to send image tags to Image Sources 120. I/O 130 includes communication hardware and optionally an application program interface (API).

Image Processing System 110 further includes Memory 135. Memory 135 includes hardware configured for the non-transient storage of data such as images, image tags, computing instructions, and other data discussed herein. Memory 135 may include, for example, random access memory (RAM), hard drives, optical storage media, and/or the like. Memory 135 is configured to store specific data, as described herein, through the use of specific data structures, indexing, file structures, data access routines, security protocols, and/or the like.

Image Processing System 110 further includes at least one Processor 140. Processor 140 is a hardware device such as an electronic microprocessor. Processor 140 is configured to perform specific functions through hardware, firmware or loading of software instructions into registers of Processor 140. Image Processing System 110 optionally includes a plurality of Processor 140. Processor 140 is configured to execute the various types of logic discussed herein.

Images received by Image Processing System 110 are first stored in an Image Queue 145. Image Queue 145 is an ordered list of images pending review, stored in a sorted list. Images stored in Image Queue 145 are typically stored in association with image identifiers used to reference the images and may have different priorities. For example, images received from a photo sharing website may have lower priority than images received from a smartphone. Generally, those images for which a requester is waiting to receive image tags representing an image in real-time are given higher priority relative to those for which the image tags are used for some other purpose. Image Queue 145 is optionally stored in Memory 135.

Within Image Queue 145 images are optionally stored in association with an image identifier or index, and other data associated with each image. For example, an image may be associated with source data relating to one of Image Sources 120. The source data can include geographic information such as global positioning system coordinates, a street and/or city name, a zip code, and/or the like. The source data may include an internet protocol address, a universal resource locator, an account name, an identifier of a smartphone, and/or the like. Source data can further include information about a language used on a member of Image Sources 120, a requested priority, a search request (e.g., an request to do an internet search based on image tags resulting from the image), and/or the like.

In some embodiments, an image within Image Queue 145 is stored in association with an indication of a particular subset of the image, the subset typically including an item of particular interest. For example, a requestor of image tags may be interested in obtaining image tags relating to the contents of a particular subset of an image. This can occur when an image includes several objects. To illustrate, considering an image of a hand with a ring on one of the fingers, the user may wish to designate the ring as being a particular area of interest. Some embodiments of the invention include an application configured for a user to specify the particular item of interest by clicking on the object or touching the object on a display of Image Source 120B. This specification typically occurs prior to sending the image to Image Processing System 110.

If an image is stored in association with an indication that a particular subset of the image is of particular importance, then an Image Marking Logic 147 is optionally used to place a mark on the image. The mark being disposed to highlight the particular subset. This mark may be made by modifying pixels of the image corresponding to the subset and this mark allows a human image reviewer to focus on the marked subset. For example, the image may be marked with a rectangle or circle prior to the image being posted to one or more of Destinations 125. For example, highlighting a subset of the image or an object within the image can include applying a filter to the object or subset, and/or changing a color of the object or subset. In alternative embodiments, Image Marking Logic 147 is included within an application configured to execute on one or more of Image Sources 120 or Destinations 125. Image Marking Logic 147 includes hardware, firmware, and/or software stored on a non-transient computer readable medium. As discussed elsewhere herein, Marking Logic 147 is optionally configured to place a mark on the image in real-time, as the image is being generated.

In some embodiments, Marking Logic 147 is configured to use image features detected within an image to identify particular objects that may be marked. The detection of image feature is discussed elsewhere herein and is optionally part of image processing that occurs on the client side, e.g., on Image Source 120A. For example, features such as edges may be detected using a processor of Image Source 120A. These features can first be used in highlighting objects for detection and then also sent from Image Source 120A to Image Processing System 110 where they are then used to generate image descriptors as part of processing the image. In this way automated processing of the image is distributed between Image Source 120A, Image Processing System 110 and/or Automatic Identification System 152.

Under the control of Processor 140, images within Image Queue 145 are provided to an Automatic Identification Interface 150. The images are provided thus as a function of their priority and position in Image Queue 145. Automatic Identification interface 150 includes logic configured to communicate the image, and optionally any data associated with the image, to an Automatic Identification System 152. The logic is hardware, firmware, and/or software stored on a computer readable medium. Automatic Identification Interface 150 is further configured to receive a computer generated review of the image from Automatic Identification System 152, the computer generated review including one or more image tags identifying contents of the image. In some embodiments, Automatic Identification Interface 150 is configured to communicate the image and data via Network 115 in a format appropriate for an application programming interface (API) of Automatic Identification System 152. In some embodiments, Automatic Identification System 152 is included within Image Processing System 110 and Automatic Identification Interface 150 includes, for example, a system call within an operating system or over a local area network.

Automatic Identification System 152 is a computer automated system configured to review images without a need for human input on a per picture basis. The output of Automatic Identification System 152 is a computer generated image review (e.g., a review produced without human input on a per picture basis.) Rudimentary examples of such systems are known in the art. See, for example, Kooaba, Clarifai, AlchemyAPI and Catchoom. Automatic Identification System 152 is typically configured to automatically identify objects within a two dimensional image based on shapes, characters and/or patterns detected within the image. Automatic Identification System 152 is optionally configured to perform optical character recognition and/or barcode interpretation. In some embodiments, Automatic Identification System 152 is distinguished from systems of the prior art in that Automatic Identification System 152 is configured to provide a computer generated review that is based on the image subset indication(s) and/or image source data, discussed elsewhere herein.

Automatic Identification System 152 is optionally configured to determine if a copy of the image received from a different image source has already been tagged. For example, the same image may be included in multiple webpages. If the image is extracted from a first of these webpages and tagged, Automatic Identification System 152 may recognize that the image has already been tagged and automatically assign these tags to each instance of the image found. Recognizing that an image has already been tagged optionally includes comparing the image, a part of the image, or data representative of the image to a database of previously tagged images. The image may have been previously tagged automatically or manually.

In addition to one or more image tag(s), a computer generated review generated by Automatic Identification System 152 optionally includes a measure of confidence representative of a confidence that the one or more image tags correctly identify the contents of the image. For example, a computer generated review of an image that is primarily characters or easily recognizable shapes may have a greater confidence measure than a computer generated review of an image that consists of abstract or ill-defined shapes. Different automated image recognition systems may produce different confidence levels for different types of images. Automatic Identification Interface 150 and Automatic Identification System 152 are optional in embodiments in which automatic identification is performed by a third party.

Image Processing System 110 further includes a Reviewer Pool 155 and Reviewer Logic 157 configured to manage the Reviewer Pool 155. Reviewer Pool 155 includes a pool (e.g., group or set) of human image reviewers. Each of the human image reviewers is typically associated with a different member of Destinations 125. For example, each of the different members of Destinations 125 may be known to be operated by a different human image reviewer or to be logged into an account of a different human image reviewer. Memory 135 is optionally configured to store Reviewer Pool 155. In some embodiments, the human image reviewers included in Reviewer Pool 155 are classified as "active" and "inactive." For the purposes of this disclosure, an active human image reviewer is considered to be one that is currently providing image tags or has indicated that they are prepared to provide image tags with minimal delay. In embodiments that include both active and inactive human image reviewers, the active reviewers are those that are provided image for review. The number of active reviewers may be moderated in real-time in response to a demand for image reviews. For example, the classification of a human image reviewer may be changed from inactive to active based on a number of unviewed images in Image Queue 145. An inactive reviewer is one that is not yet active, that has let the review of an image expire, and/or has indicated that they are not available to review images. Inactive reviewers may request to become active reviewers. Inactive reviewers who have made such a request can be reclassified as active human image reviewers when additional active human image reviewers are needed. The determination of which inactive reviewers are reclassified as active reviewers is optionally dependent on a reviewer score (discussed elsewhere herein).

Reviewer Logic 157 is configured to manage Reviewer Pool 155. This management optionally includes the classification of human image reviewers as active or inactive. For example, Reviewer Logic 157 may be configured to monitor a time that a human image reviewer takes to review an image and, if a predetermined maximum review time (referred to herein as an image expiration time), changing the classification of the human image reviewer from active to inactive. In another example, Reviewer Logic 157 may be configured to calculate a review score for a human image reviewer. In some embodiments, the review score is indicative of the completeness, speed and/or accuracy of image reviews performed by the particular human image reviewer. The review score can be calculated or changed based on review times and occasional test images. These test images may be, for example images placed in Image Queue 145 that have been previously reviewed by a different human image reviewer. The review score may also be a function of monetary costs associated with the human image reviewer. Reviewer Logic 157 includes hardware, firmware, and/or software stored on a non-transient computer readable medium. In some embodiments, reviewer scores are manually determined by human moderators. These human moderators review ages and the tags assigned to these images by human image reviewers. Moderators are optionally sent a statistical sampling of reviewed images and they assign a score to the tagging of the images. This score is optionally used in determining reviewer scores.

In some embodiments, Reviewer Logic 157 is configured to monitor status of human image reviewers in real-time. For example, Reviewer Logic 157 may be configured to monitor the entry of individual words or keystrokes as entered by a reviewer at Destination 125A. This monitoring can be used to determine which reviewers are actively reviewing images, which reviewers have just completed review of an image, and/or which reviewers have not been providing tag input for a number of seconds or minutes. The entry of tag words using an audio device may also be monitored by Reviewer Logic 157.

In some embodiments, members of Reviewer Pool 155 are associated with a specialty in which the human image reviewer has expertise or special knowledge in. For example, a reviewer may be an expert in automobiles and be associated with that specialty. Other specialties may include art, plants, animals, electronics, music, food medical specialties, clothing, clothing accessories, collectables, etc. As is discussed elsewhere herein, a specialty of a reviewer may be used to select that reviewer during an initial manual review and/or during a review upgrade.

The review score and/or specialty associated with a human image reviewer are optionally used by Reviewer Logic 157 to determine which inactive reviewer to make active, when additional active reviewers are required. Reviewer Logic 157 includes hardware, firmware, and/or software stored on a non-transient computer readable medium.

Image Processing System 110 further includes Destination Logic 160. Destination Logic 160 is configured to determine one or more destinations (e.g., Destinations 125) to send an image to for manual review. Each of Destinations 125 is associated with a respective human image reviewer of Reviewer Pool 155. The determinations made by Destination Logic 160 are optionally based on characteristics of the human image reviewer at the determined destination. The destination may be a computing device, smartphone, tablet computer, personal computer, etc. of the human image reviewer. In some embodiments, the destination is a browser from which the reviewer has logged into Image Processing System 110. In some embodiments, determining the destination includes determining an MAC address, session identifier, internet protocol and/or universal resource locator of one of Destinations 125. Destination Logic 160 includes hardware, firmware and/or software stored on a non-transient computer readable medium.

Typically, Destination Logic 160 is configured to determine Destinations 125 associated with active rather than inactive human image reviewers as determined by Reviewer Logic 157. Destination Logic 160 is also typically configured to determine Destinations 125 based on review scores of reviewers. For example, those reviewers having higher reviewer scores may be selected for higher priority reviews relative to reviewers having lower reviewer scores. Thus, the determination of a member of Destinations 125 can be based on both reviewer scores and image review priority.

In some embodiments, Destination Logic 160 is configured to determine one or more members of Destinations 125 based on the real-time monitoring of the associated reviewers' input activity. As discussed elsewhere herein, this monitoring may be performed by Reviewer Logic 157 and can include detection of individual words or keystrokes entered by a human image reviewer. In some embodiments, Destination Logic 160 is configured to favor selecting Destination 125A at which a human image reviewer has just completed a review of an image relative to Destination 125B at which a human image reviewer is currently typing image tags on a keyboard.

In some embodiments, Destination Logic 160 is configured to use image tags received via Automatic Identification System 152 to determine one or more members of Destinations 125. For example, if an image tag of "car" is received via Automatic Identification Interface 150 then Destination Logic 160 can use this information to select a member of Destinations 125 associated with a human image reviewer that has a specialty in automobiles.

The value of an image review may also be considered in the selection of a destination for manual review. For example, an image review of high value may lead to the determination of a destination associated with a human image reviewer having a relatively high review score, while an image review of lower value may lead to the determination of a destination associated with a human image reviewer having a relatively lower review score. In some embodiments, for some image reviews, Destination Logic 160 is configured to select among Destinations 125 so as to minimize a time required to review an image, e.g., to minimize a time until the image tags of the manual review are provided to Network 115.

Destination Logic 160 is optionally configured to determine multiple destinations for a single image. For example, a first destination may be selected and then, following an upgrade request, a second destination may be determined. The upgrade request may come from the Image Source 120A or from a human image reviewer associated with the first destination. In some embodiments, Destination Logic 160 is configured to determine multiple destinations, to which the image will be posted to in parallel. For example, two, three or more destinations, each associated with a different human image reviewer, may be determined and the same image posted to all determined destinations in parallel. As used in this context, "in parallel" means that the image is posted to at least a second destination before any part of a review is received from the first destination.

In various embodiments, there are a variety of reasons that two or more destinations may be determined by Destination Logic 160. For example, a request for an upgraded review may require a human image reviewer having a particular specialty. Referring to the automotive example, an image that is first tagged with the tag "white car" may result in an upgrade request for more information. Destination Logic 160 may be configured to then select a destination associated with a human image reviewer have a specialty in automobiles, e.g., a reviewer who can provide the tags "1976 Ford Granada." An upgrade request indicates that the image is subject to further review, e.g. the image requires or may benefit from further review. The upgrade request may be represented by a computing object such as a flag, command or data value, etc.

Another instance that may require a second destination occurs when the manual review of an image takes too long.

Typically, the tagging of an image should occur within an allotted time period or the review is considered to expire. The allotted time period is optionally a function of the priority of the image review. Those reviews that are intended to occur in real-time may have a shorter time period relative to lower priority reviews. If the review of an image expires, Image Processing System 110 is optionally configured to provide the image to an additional human image reviewer associated with a destination determined by Destination Logic 160.

Another instance that may require a second destination occurs when a first human reviewer makes an upgrade request. For example, the request to upgrade the review resulting in a tag of "car" may come from the human image reviewer that provided the tag "car." While this example is simplistic, other examples may include images of more esoteric subject matter such as packaged integrated circuits.

Image Processing System 110 further includes Image Posting Logic 165 configured to post images for manual review to Destinations 125 determined by Destination Logic 160. Posting typically includes communicating the images to one or more Destinations 125 via Network 115. In various embodiments, Image Posting Logic 165 is further configured to provide information associated with the image to Destinations 125. For example, Image Posting Logic 165 may post, along with the image, an indication of a subset of the image (e.g., subset identification), an image marked by Image Marking Logic 147, information identifying a source of the image (e.g., source data discussed elsewhere herein), a priority of the review of the image, an image expiration period, location information associated with the image, and/or the like. As discussed elsewhere herein, source data can includes a universal resource locator, global positioning coordinates, longitude and latitude, an account identifier, an internet protocol address, a social account, an photo sharing account, and/or the like.

In some embodiments Image Posting Logic 165 is configured to provide an image for manual review to more than one of Destinations 125 at the approximately the same time. For example, an image may be provided to Destination 125A and Destination 125B in parallel. "Parallel delivery" means, for example, that the image is provided to both Destinations 125A and 125B before tagging information is received back from either of these Destinations 125.

In some embodiments, Image Posting Logic 165 is configured to provide an image for manual review to one or more of Destinations 125 prior to receiving image tags from Automatic Identification System 152. Alternatively, in some embodiments, Image Posting Logic 165 is configured to wait until a computer generated review for the image is received from Automatic Identification System 152, prior to posting the image to one or more of Destinations 125. In these embodiments, the computer generated review (including image tags) is optionally also posted to the one or more of Destinations 125 in association with the image.

Image Posting Logic 165 is optionally configured to post identifiers of images along with the images. Image Posting Logic 165 includes hardware, firmware and/or software stored on a non-transient computer readable medium.

Image Processing System 110 further includes Review Logic 170 configured to manage the manual and automated reviews of images. This management includes monitoring progress of reviews, receiving reviews from Automatic Identification System 152 and/or Destinations 125. The received reviews include image tags as discussed elsewhere herein. In some embodiments, Review Logic 170 is configured to control posting of the image to one of Destinations 125 based on a measure of confidence. The measure of confidence being representative of a confidence that one or more image tags already received are correct. These one or more image tags may be received from Automatic Identification System 152 and/or one of Destinations 125. For example, in some embodiments if the confidence of an image review by Automatic Identification System 152 is greater than a predetermined threshold, then Review Logic 170 may determine that manual review of the image is not necessary. The predetermined threshold can be a function of the value of the image review, of the priority of the image review, of the number and quality of the available Destinations 125, and/or the like. Review Logic 170 includes hardware, firmware, and/or software stored on a non-transient computer readable medium.

In some embodiments, if an image was sent to Automatic Identification System 152 in parallel with being sent to one or more of Destinations 125, then the receipt of a review from Automatic Identification System 152 having a confidence above a predetermined threshold may result in cancellation of the manual review at the one or more of Destinations 125 by Review Logic 170. Likewise, if an image is sent to multiple Destinations 125 in parallel, and an image review is received from a first of these Destinations 125, then Review Logic 170 is optionally configured to cancel the review requests for the image at the other Destinations 125. In some embodiments, Review Logic 170 is configured to cancel the review request at the other Destinations 125 once a keystroke or word is received from the first of the Destinations 125.

In some embodiments Review Logic 170 is configured to monitor activity of a human image reviewer in real-time. This monitoring can include receiving review inputs from Destinations 125 on a word by word or individual keystroke basis. As discussed elsewhere herein, the words and/or keystrokes are optionally passed on to one of Image Sources 120 as they are received by Review Logic 170. The monitoring of a manual reviewer's activity can be used to determine when the review of an image expires and/or the progress in completing a manual image review. The status of a human image reviewer may be provided by Review Logic 170 to Reviewer Logic 157 in real-time. Using this status, Reviewer Logic 157 may change the status of the reviewer from active to inactive, adjust a stored review score of the reviewer, establish or change a specialty for the reviewer, and/or the like.

In some embodiments Review Logic 170 is configured to control posting of images to Destinations 125 by receiving measures of confidence (e.g., of the accuracy of image reviews) and sending responsive signals to Destination Logic 160 and/or Image Posting Logic 165. As such, Review Logic 170 can be configured to control posting of an image to one or more of Destinations 125 based on a measure of confidence. The measure of confidence being representative of a confidence that one or more image tags correctly identify the contents of the image. In some embodiments, Review Logic 170 is configured to receive reviews from manual image reviewers that include information other than image tags. For example, Review Logic 170 may receive an upgrade request from a human image reviewer and cause an upgraded image review to be requested. Review Logic 170 is optionally configured to process other non-tag information received in a manual or computer generated review. This information can include identification of the image as being improper (e.g., obscene), identification of the image as containing no identifiable objects, identification of the image as having been sent to a reviewer of the wrong specialty, and/or the like.

In some embodiments, Review Logic 170 is configured to adjust the confidence of an image review by comparing image reviews of the same image from multiple sources. These image reviews may all be computer generated, all be manual reviews, or include at least one computer generated review and at least one manual review.

In some embodiments, Review Logic 170 is configured to provide image tags received as part of a first (computer generated or manual) review and to provide the received image tags to a human image reviewer at Destinations 125B. An agent (e.g., a browser or special purpose application) executing on Destination 125B is optionally configured to provide the image tags of the first review to a display of Destination 125B. In this manner, the human image reviewer at Destination 125B can edit (add to, delete and/or replace) the image tags of the first review. For example, image tags received from Destination 125A may be provided to Destination 125B for modification.

In some embodiments, Review Logic 170 is configured to calculate review scores based on the results of image reviews received from Destinations 125, the time taken for these image reviews, and the accuracy of these image reviews.

In some embodiments Review Logic 170 is configured to provide image reviews to a source of the image, e.g., one of Image Sources 120, using a Response Logic 175. The image reviews may be provided when the image review is complete, on a character by character basis, or on a word by word basis. When provided on a character by character basis or a word by word basis, the image tags are optionally provided to the source of the image as the characters or words are received from a human image reviewer. Optionally Response Logic 175 is configured to provide the image review via Network 115.

Image reviews are not necessarily returned to one of Image Sources 120. For example, if Image Source 120A is a photo sharing service or a social networking website, image reviews of images from Image Source 120A may be stored in association with an account on the photo sharing service or the social networking website. This storage can be in Memory 135 or at a location external to Image Processing System 110, such as at a webserver hosting the website. Image reviews are optionally both returned to one of Image Sources 120 and stored elsewhere.

In some embodiments, Response Logic 175 is configured to execute a search based on image tags received in a computer generated and/or manual image review. The results of this search can be provided to a source of the image, e.g., Image Source 120A or 120B. For example, in some embodiments a user uses a smartphone to create an image with a camera of Image Source 120A. The image is provided to Image Processing system 110 which generates an image review of the image using Automatic Identification System 152 and Destination 125A. The image review includes image tags that are then automatically used to perform an internet search (e.g., a google or yahoo search) on the image tags. The results of this internet search are then provided to the user's smartphone.

In some embodiments, Response Logic 175 is configured to provide image tags of a computer generated and/or manual review to an Advertising System 180. Advertising System 180 is configured to select advertisements based on the image tags. The selected advertisements are optionally provided to the source of the image used to generate the image tags. For example, Response Logic 175 may provide the tags "1976 Ford Granada with broken headlight" to Advertising System 180 and, in response, Advertising System 180 may select advertisements for replacement headlights. If the source of the image used to generate these tags is a website, the advertisements may be displayed on the website. Specifically, if the source of the image is an account on a photo sharing or social networking website, then the advertisements may be displayed on that account. Advertising System 180 is optionally included in Image Processing System 110. Advertising System 180 is optionally configured to take bids for providing advertising in response to specific tags. Advertising System 180 optionally includes Google's Adwords.

Image Processing System 110 optionally further includes Content Processing Logic 185 configured to extract images for tagging from members of Image Sources 120. Content Processing Logic 185 is configured to parse webpages including images and optionally text, and extract images from these webpages for tagging. The resulting image tags may then be provided to Advertising System 180 for selection of advertisements that can be placed on the webpage from which the image was extracted. In some embodiments, Content Processing Logic 185 is configured to emulate browser functions in order to load images that would normally be displayed on a webpage. These images may be displayed on a webpage associated with a specific account, a social networking site, a photo sharing site, a blogging site, a news site, a dating site, a sports site, and/or the like. Content Processing Logic 185 is optionally configured to parse metadata tags in order to identify images.

Content Processing Logic 185 is optionally configured to parse text disposed on the same webpage as an image. This text may be used by Automatic Identification System 152 in tagging of the image, in combination with content of the image. For example, Content Processing Logic 185 may be configured to identify a caption for an image, comments made about an image, text referring to the image, webpage title or headings, people or objects tagged within an image, text within an image (as determined by optical character recognition (OCR)), and/or the like. The text parsed by Content Processing Logic 185, or a subset thereof, may be used to improve quality and/or speed of tagging. The text parsed is provided to Automatic Identification System 152 and or provided to one of Destinations 125 for tagging by a human reviewer. In some embodiments Automatic Identification System 152 is configured to use the provided text in the generation of tags for the image. For example, the provided text may be used to provide context, identify a lexicon, ontology, language, and/or information that improves the accuracy, precision, computational efficiency, and/or other quality of automatically and/or manually generated image tags. The provided text is typically not relied on solely as a source of the generated tags, but is used as an input to improve the processing of the image. As such, the resulting tags may include words other than those found in the provided text.

In some embodiments, Image Posting Logic 165 is configured to provide both an image and text found on the same webpage as the image to Destinations 125. For example, an image of a girl and a bicycle at a park may have a caption "Mountain Bike Sale" or a comment "Happy Birthday Julie." At Destination 125 this text may be presented to a human reviewer together with the image. The human reviewer may use this information to better understand the focus and/or context of the image, and thereby provide better image tags. Likewise, in some embodiments, Automatic Identification Interface 150 is configured to provide both an image and text fund on the same webpage as the image to Automatic Identification System 152. At Automatic Identification System 152 the provided text is used to improve the automated tagging of the image based on contents of the image. In the above example, the provided text may suggest to Automatic Identification System 152 that emphasis should be placed on the bike or on Julie. This may result in such widely different tags as "Schwinn Bike" or "Birthday Girl."

Image Processing System 110 optionally further includes an Image Ranker 190. Image Ranker 190 is configured to determine a rank (e.g., priority) for tagging an image. The priority may be used to determine how or if at all to tag an image. The determination of priority may be based on, for example, a source of the image, a number of times the image is loaded onto a webpage, a position of the image on a webpage, a number of times the image is viewed on a webpage, a number of webpages on which an image included, a ranking of one or more webpage including the image, an identity of a webpage including the image, a ranking of a second image on the webpage including the image, an owner of webpage including the image, a domain name of a webpage including the image, a keyword on a webpage including the image, text found on a webpage including the image, metadata found on a webpage including the image, a number of times the image is clicked on the webpage, a number of times other images are clicked on the webpage, whether the image is part of a video, image tags automatically generated using Automatic Identification System 152, any combination of these examples, and/or the like. Image Ranker 190 includes logic in the form of hardware, firmware, and/or software stored on a computer readable medium. Image Ranker 190 includes logic in the form of hardware, firmware, and/or software stored on a computer readable medium. In various embodiments, the priority determined by Image Ranker 190 includes two levels (tag or no-tag), three levels (automatic tagging, manual tagging, or no-tag), ten priority levels, or some other ranking scheme.

Destination Logic 160 is optionally configured to select a destination of manual tagging of an image based on the priority of the image.

In those embodiments, wherein a number of times the image is loaded onto a webpage is used to determine priority, the number may be per a fixed time period such as per day or per month. The number can be determined by including a line of Java or HTML script on the webpage, as is well known in the art. The position of the image on the webpage may be considered as some images may require that a viewer scroll down before the image is viewed. As such, the number of times the image is actually viewed may be used to calculate the image's priority. Typically, greater priority is assigned to images that are viewed more often. Image Ranker 190 is optionally configured to assign priority to an image based on a number of times the image is clicked on the webpage or on other webpages, and/or a number of times other images are clicked on the webpage. Image Ranker 190 is optionally configured to determine priority based on a number of times an image is viewed on more than one webpage. For example, if the image is found on 25 different webpages, then the sum of the views on all the webpages may be used to determine priority for the image. In some embodiments Image Ranker 190 is configured to determine priority based on a number of times an image is loaded in a browser.

Popular images may be included in a number of webpages. For example an image that is widely shared on a social media website may be included on numerous webpages. Image Ranker 190 may be configured to calculate the priority of an image as a function of the number of webpages on which it is included and/or the number of webpages that include a link to the image. Image Ranker 190 is optionally configured to identify an image as being included on multiple, possibly otherwise unrelated, webpages. In some embodiments Image Ranker 190 is configured to use a third party service, such as TinEye.com, to determine the number of webpages on which an image is located. Typically, the greater the number of webpages on which an image is included, the greater the priority assigned to the image.

In some embodiments, Image Ranker 190 is configured to calculate a priority of an image based on a ranking of one or more webpages that include the image. For example, if a webpage is highly ranked in a search engine, is linked to by a significant number of other webpages, or well ranked on some other criteria, then an image on the webpage may be given a priority that is a function of the webpages' ranking. Typically the higher ranking a webpage has the greater priority is assigned to an image on the webpage. Webpage ranking is optionally obtained from a third party source, such as a search engine.

Image Ranker 190 is optionally configured to assign a priority to an image based on an identity of a webpage including the image. For example, an image on a home page for a URL may be assigned greater priority than an image at another webpage for the same website. Further, images may be assigned a priority based on specific types of webpages on which the image is included. For example, images on social networking websites may be given higher priority relative to images on company websites or personal blogs. In another example, images on reference webpages such as dictionary.com or Wikipedia.com may be give higher priority relative to some other types of webpages. The priority assigned to an image is optionally based on the identity of an owner of the webpage.

In some embodiments, Image Ranker 190 is configured to determine a priority of a first image on a webpage as a function of the priority of a second image on same webpage. For example, if the second image has a high priority the priority of the first image may be increased accordingly.

Image Ranker 190 is optionally configured to assign a priority to an image based on other contents of a webpage on which the image is included. For example, if the webpage includes text and/or metadata the presence of specific terms or keywords in this text or metadata may be used to assign the priority of the image. Specifically, if a webpage includes a valuable keyword then an image on that webpage may be assigned a higher priority. The estimated monetary value of a keyword is associated with the value of the word for advertising or some other purpose, e.g., a word that has value on Google's Adwords®. An image on a webpage that includes terms that would be valued highly as Adwords may be assigned a proportionally high priority. The frequency of use of these terms as well as their number on a webpage may also be considered by Image Ranker 190 in determining image priority. The text and/or metadata considered may be included in the URL of the webpage, within a figure caption, within a comment made on a figure, within a tag assigned to the image by a third party, near text referring to the image, a person's name, a brand name, a trademark, a corporate name, and/or the like.

In some embodiments, Image Ranker 190 is configured to receive text derived from an image using optical character recognition and to determine a priority for the image based on this text. For example, Image Ranker 190 may receive text generated by processing an image using Automatic Identification system 152, and assign a priority to the image based on this text. In some embodiments, Image Ranker 190 is configured to give a higher priority to a first image on a webpage, relative to images that occur further down the webpage.

Image Ranker 190 is further configured to determine how, if at all, to tag an image based on the assigned priority. For example, images of lowest priority may not be tagged at all. Images with somewhat higher priority may be tagged using Automatic Identification System 152, and image with yet higher priority may be tagged by a human reviewer at one of Destinations 125. Those images having priority sufficiently high to be tagged by a human reviewer are optionally further divided into higher and lower priority groups wherein images in the higher priority group are given more attention and tagged more thoroughly or carefully by the human reviewer. Image Posting Logic 165 is optionally configured to provide an indication of the priority of an image, along with the image, to members of Destinations 125.

In some embodiments, images are first processed using Automatic Identification System 152. Then the images may be sent to one or more members of Destinations 125 based on both a priority for the image and a confidence in the automated tagging performed by Automatic Identification System 152. For example, if the image has relatively low priority then the confidence standard for sending the image to a human reviewer is set relatively low. (A low confidence standard meaning that the automated tags are likely to be deemed sufficient and the image not sent for human analysis.) If the image has a relatively high priority then the confidence standard for sending the image to a human reviewer is relatively higher. Thus, high priority images require a greater confidence to rely just on the automated tagging and are more likely to be sent to a human reviewer.

The processing paths that may be selected by Image Ranker 190 for an image include, for example, a) not tagging at all, b) tagging using just Automatic Identification System 152, c) tagging using Automatic Identification System 152 with optional human follow-up based on the importance and/or confidence of the resulting tags. d) automated tagging followed by human review of the automated tags, e) tagging by a human reviewer, and/or f) tagging by a human reviewer based on a suggested level of attention to be given by the human reviewer. These processing paths are, at least in part, selected based on the priority assigned to the image by Image Ranker 190. Any combination of these processing paths may be found in various different embodiments. In some embodiments, the result of controlling the type of processing used to tag an image results in those images that are potentially more valuable to have a greater probability of being tagged. As a result, the human tagging resources are applied to the highest priority—most valuable images.

In some embodiments, Image Ranger 190 is configured to assign a priority for an image based on how often an advertisement displayed adjacent to or over an image is clicked on. For example, if an image is on a frequently viewed webpage, but advertisements placed over the image are rarely clicked, then the image may be given a relatively high priority for tagging. In this example, an image may be tagged more than once. If advertisements based on initial tags are not clicked on with an expected frequency, then the image may be retagged. Retagging is optionally performed by a human reviewer who receives, via Image Posting Logic 165, the image and the initial (inadequate) tags. The human reviewer can use this information to provide improved tags.

Figure 2:
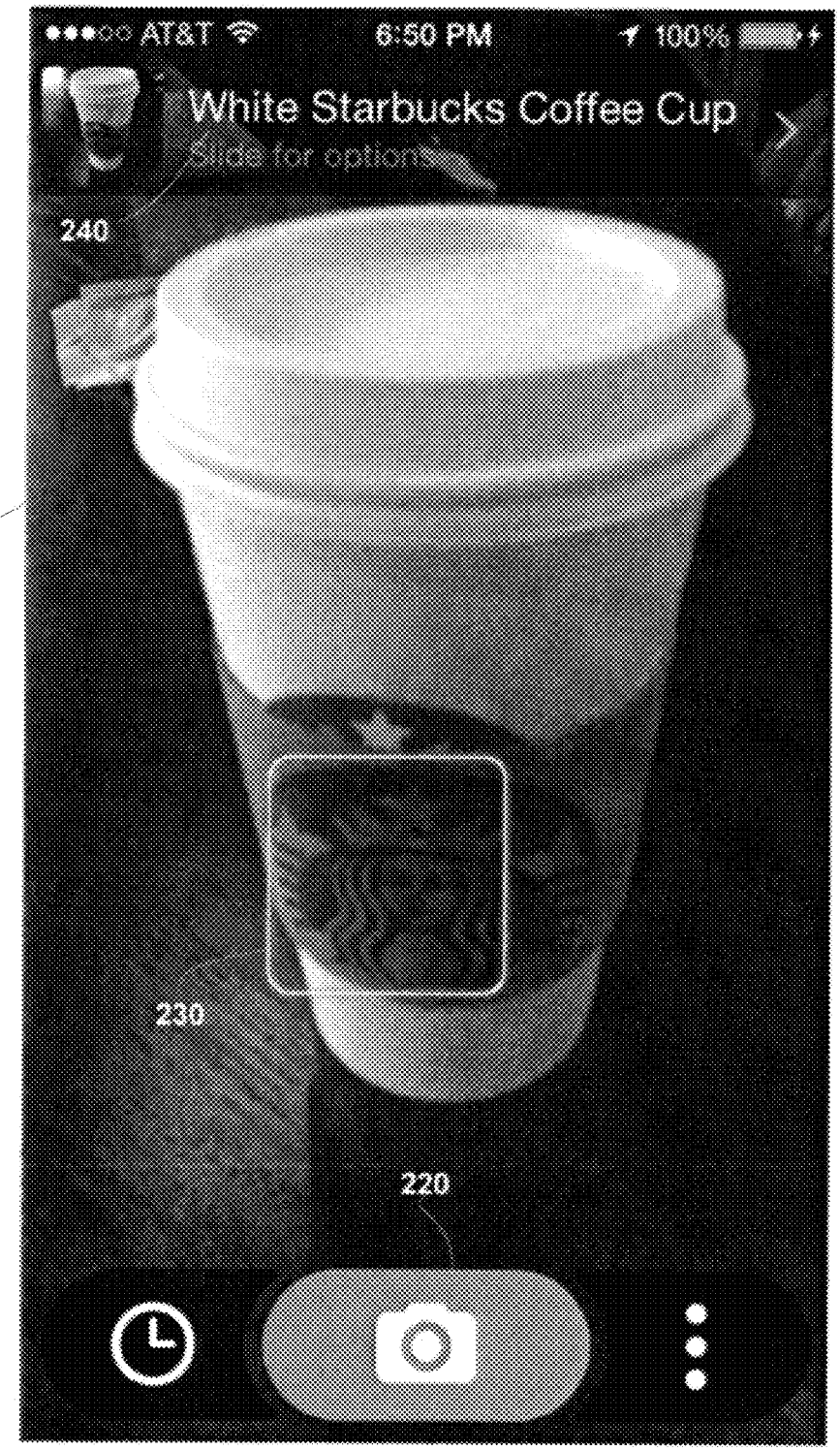
FIG. 2 illustrates an image capture screen, according to various embodiments of the invention.

FIG. 2 illustrates an Image Capture Screen 210, according to various embodiments of the invention. Image Capture Screen 210 as illustrated is generated by, for example, an application executing on a smartphone, electronic glasses or other Image Source 120. Image Capture Screen 210 is includes features configured to capture an image, mark a specific area of interest, and receive image tags. Specifically, Image Capture Screen 210 includes a Shutter Button 220 configured to take a picture. Once the picture is taken it is optionally automatically sent via Network 115 to Image Processing System 110 for tagging. Image Capture Screen 210 optionally further includes a Rectangle 230 configured to highlight a point of interest within the image. Rectangle 230 is controllable (e.g., movable) by selecting and/or dragging on the screen using a user input device. On a typical smartphone this user input device may include a touch screen responsive to a finger touch. As described elsewhere herein, the point/region of interest may be provided to Image Processing System 110 in association with an image to be tagged.

Image Capture Screen 210 further includes a Field 240 showing a previously captured image and resulting image tags. In the example, show the previously captured image includes the same white cup without the Rectangle 230 and the image tags include "White Starbucks Coffee Cup." Also shown is text stating "Slide for options."

Figure 3:
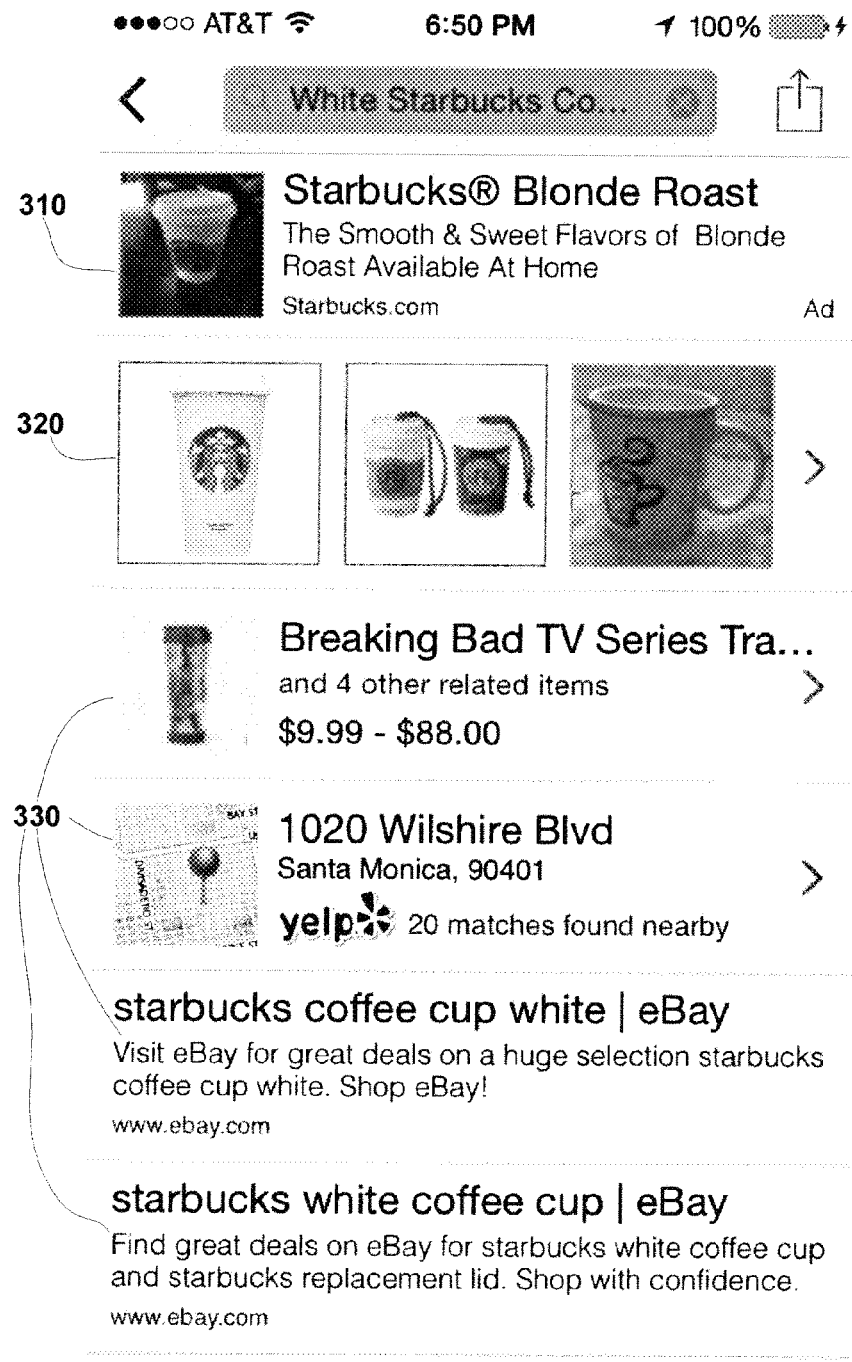
FIG. 3 illustrates search results based on an image analysis, according to various embodiments of the invention.

FIG. 3 illustrates search results based on an image analysis, according to various embodiments of the invention. These results are optionally displayed automatically or in response to selecting the "Slide for options" input shown in FIG. 2. They may be generated by automatically executing an internet search on the image tags. Illustrated in FIG. 3 are a Sponsored Advertisement 310, Related Images 320 and other search results 330. The search results are optionally generated using Advertising System 180 and image tags generated using Image Processing System 110. A user may of the option of reviewing previously tagged images. This history can be stored on Image Source 120A or in Memory 135.

Figure 4:
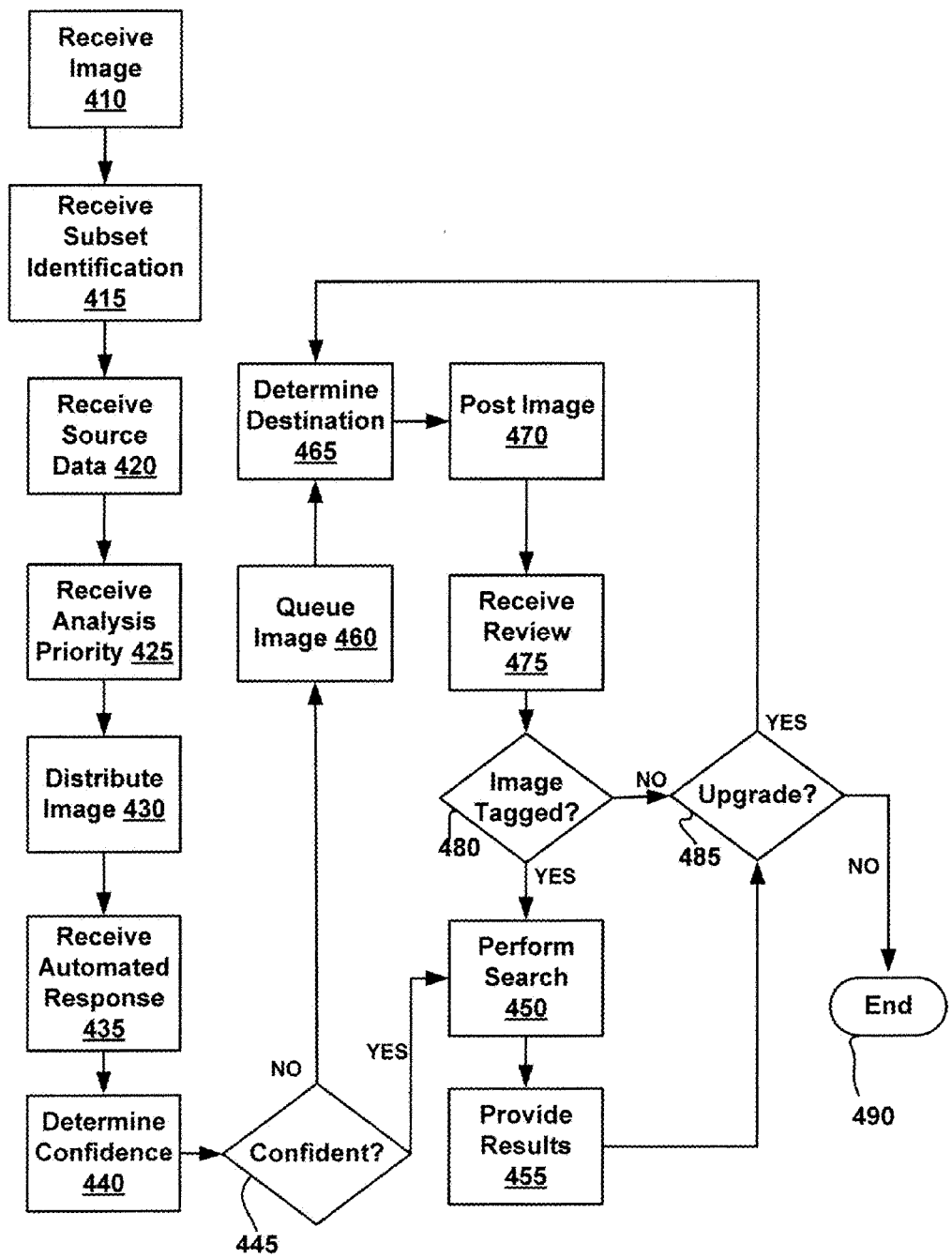
FIG. 4 illustrates methods of processing an image, according to various embodiments of the invention.

FIG. 4 illustrates methods of processing an image, according to various embodiments of the invention. In these methods an image is received. The image is provided to both Automatic Identification System 152 and at least one of Destinations 125. As a result, both computer generated and manual image reviews are produced. The methods illustrated in FIG. 4 are optionally performed using embodiments of the system illustrated in FIG. 1. The method steps illustrated in FIGS. 4-8 may be performed in a variety of alternative orders.

In a Receive Image Step 410 and image is received by Image Processing System 110. The image is optionally received from one of Image Sources 120 via Network 115. The image may be in a standard format such as TIF, JPG, PNG, GIF, etc. The image may be one of a sequence of images that form an image sequence of a video. The image may have been captured by a user using a camera. The image may have been captured by a user from a movie or television show. In some embodiments Receive Image Step 410 includes a user using an image capture application to capture the image and communicate the image to Image Processing System 110. This application may be disposed within a camera, television, video display device, multimedia device, and/or the like. Receive Image Step 410 is optionally facilitate using Content Processing Logic 185.

In one illustrative example, the image is received from image sequence, e.g. a video. The video is displayed on a monitor, television, goggle, glasses, or other display device.

The video is optionally received via a video streaming service such as youtube.com or Netflix.com® and/or displayed within a browser. Logic within the display system (e.g., Image Marking Logic 147 within Image Source 120A) is configured for a user to indicate a particular subset of the images within the video. The same logic may be configured to receive an advertisement selected in response to image tags generated from the image and to display the advertisement over or at the same time as the video. Selection of advertisements based on image tags is discussed further elsewhere herein.

Specifically, using this system, a user may select an object within a video or movie for tagging and in response optionally receive tags characterizing that object. The user may also or alternatively receive an advertisement selected based on the tags. The advertisement may be displayed in real-time in conjunction with the video (e.g., as an overlay or added video sequence) or provided to the user via other communication channels (e.g., e-mail). In one illustrative example, a user sees an object within a video that they like. They select the object and this selection is received in Receive Image Step 410. In response they receive an advertisement related to the object. The advertisement is displayed as an overlay, bar or caption on the video in real-time as the video is viewed on the display. The advertisement is optionally interactive in that it includes a link to make a purchase.

In some embodiments, objects within an image may include particular characteristics configured to assist in identifying the object. For example, a particular pattern of data bits may be encoded within the image or within object of the image. These data bits may encode for an image tag.

In an optional Receive Subset Identification Step 415, data identifying one or more subsets of the image is received by Image Processing System 110. Typically, the one or more subsets include a set of image pixels in which an item of particular interest is located. The one or more subsets may be identified by pixel locations, screen coordinates, areas, and/or points on the received image. In some embodiments, the subsets are selected by a user using a touch screen or cursor of one of Image Sources 120.

In an optional Receive Source Data Step 420, source data regarding the source of the image, received in Receive Image Step 410, is received by Image Processing System 110. As discussed elsewhere herein, the source data can include geographic information, an internet protocol address, a universal resource locator, an account name, an identifier of a smartphone, information about a language used on a member of Image Sources 120, a search request, user account information, and/or the like. In some embodiments, source data is automatically sent by an application/agent running on Image Source 120. For example, global positioning system coordinates may automatically be generated on a smartphone and provided to Image Processing System 100.

In an optional Receive Analysis Priority Step 425 a priority for the tagging of the image, received in Receive Image Step 410, is received within Image Processing System 110. In some embodiments, the priority is manually entered by a user of Image Source 120A. In some embodiments, the priority is dependent on an amount paid for the review of the image. In some embodiments, the priority is dependent on a type of Image Sources 120A. For example, images received from a static website may automatically be given a lower priority relative to images received from a handheld mobile device. An image whose source is identified by a universal resource locator may be given a lower priority relative to images whose source is identified by a mobile telephone number. As such, the priority is optionally derived from the source data received in Receive Source Data Step 420.

The image and data received in Steps 410-425 are optionally received together and optionally stored in Memory 135.

In a Distribute Image Step 430, the image, and optionally any associated data received in Steps 415-425, is distributed to Automatic Identification System 152 via Automatic Identification Interface 150. This distribution may be internal to Image Processing System 110 or via Network 115.

In a Receive Automated Response Step 435, a computer generated image review is received from Automatic Identification System 152. The computer generated image review includes one or more image tags assigned to the image by Automatic Identification System 152. The computer generated image review also includes a measure of confidence. The measure of confidence is a measure of confidence that the image tags assigned to the image correctly characterize contents of the image. For example, an image including primarily easily recognizable characters may receive a higher measure of confidence relative to an image of abstract shapes.

In an Optional Determine Confidence Step 440, the measure of confidence included in the image review is compared with one or more predetermined levels. The predetermined levels are optionally a function of the priority of the image review, a price of the image review, a source of the image, and/or the like. In an Optional Confident? Step 445 the process proceeds to an optional Perform Search Step 450 if the confidence of the computer generated image review is above the predetermined threshold(s) and proceeds to a Queue Image Step 460 if the confidence of the computer generated image is below the predetermined threshold(s). Determine Confidence Step 440 is optionally performed using Review Logic 170.

In Perform Search Step 450, the image tags assigned to an image are used to perform a search. For example, the image tag "Ford car" may be used to automatically perform a google search using the words "Ford" and "car."

In a Provide Results Step 455, the image tags assigned to the image and optionally the results of a search performed in Perform Search Step 450 are provided to a requester of the image review. For example, if the image was received from Image Source 120A and Image Source 120A is a smartphone, then the image tags and search results are typically provided to the smartphone. If the image was received from a member of Image Sources 120, such as a website, that the image tags and optional search results may be provided to a host of the website, to a third party, to Advertising System 180, and/or the like. In some embodiments, the image tags are automatically added to the website such that the image tags are searchable, e.g., can be searched on to find the reviewed image.

In Queue Image Step 460, the image is placed in Image Queue 145. This placement optionally includes marking a subset of the image using Image Marking Logic 147. As described elsewhere herein, the marking is typically configured to identify objects of particular interest in the image. Advancement of the image in Image Queue 145 may be dependent on the image's review priority, the source of the image, available human image reviewers, the measure of confidence of the computer generated review of the image, and/or the like.

In a Determine Destination Step 465 one or more members of Destinations 125 are determined for the manual review of the image. The determination of a destination is optionally based on image tags included in a computer generated image review received from Automatic Identification System 152; optionally based on specialties of human image reviewers at different Destinations 120; optionally based on review scores of these human image reviewers, and/or based on other criteria discussed herein. In some embodiments, Determine Destination Step 465 is based on the data characterizing the image and a specialty of the human reviewer. The data characterizing the image can be image features, image descriptors, and/or information derived therefrom. As is discussed elsewhere herein, the image features and/or image descriptors are optionally received along with the image from a member of Image Sources 120. Information derived therefrom may be generated at the member of Image Sources 120, at Image Processing System 110 and/or at Automatic Identification System 152.

In a Post Image Step 470, the image is posted to at least one of the Destinations 125 determined in Determine Destination Step 465. In some embodiments, Post Image Step 470 includes posting the image to more than one of Destinations 125 in parallel. The image is optionally posted via Network 115 and is optionally posted along with a mark highlighting a subset of the image, source data for the image, a time before review expiration for the image, image tags for the image received from Automatic Identification System 152, and/or the like.

In a Receive Review Step 475, a manual review of the image is received from one or more of the determined Destination(s) 125. The manual image review may include one or more image tags assigned to the image by a human image reviewer. The one or more image tags are representative of the content of the image. The manual review may also include an upgrade request, an indication that the image is unreviewable, an indication that the image is improper, an indication that the review expired, and/or the like.

In an Image Tagged? Step 480 the progress of the method is dependent on whether age tags were received in Receive Review Step 475. If image tags characterizing the content of the image were received then the method optionally proceeds with Perform Search Step 450 and Provide Results Step 455. In these steps the image tags included in the manual image review and optionally the computer generated image review are used. Use of the image tags in the computer generated image review may be dependent on the confidence measure of this review.

Steps 460-475 are optional if in Step 445 the confidence measure is found to be above the predetermined threshold(s).

In an optional Upgrade? Step 485 the progress of the method is dependent on whether an upgrade request has been received. If such a request has been received then the method proceeds to Determine Destination Step 465 wherein a second/different member of Destinations 125 is determined. The determination may depend on image tags received in the manual image review received in Receive Review Step 475. The upgrade request may be received from a human image reviewer or from a requester of the image review (from Image Source 120A or 120B, etc.). The upgrade request may be received after the requestor has had a chance to review the image tags provided in Provide Results Step 455. For example, the requestor may first receive image tags consisting of "white car" and then request a review upgrade because they desire further information. The review upgrade may result in the image being provided to a human image reviewer with a specialty in automobiles. This human image review can add to the existing image tags to produce "white car, 1976 Ford Granada." In some embodiments, the requester can add source data indicating a subset of the image when requesting a review upgrade. For example, the reviewer may wish to indicate particular interest in a broken headlight. This serves to direct the human image reviewers attention to this feature of the image, produce tags that include "broken headlight," and result in a search (Perform Search Step 450), directed toward broken headlights for a 1976 Ford Granada.

In some embodiments, upgrade request are generate automatically by Review Logic 170. For example if an image review appears too brief, e.g., just "car," then Review Logic 170 may automatically initiate a review upgrade. In some embodiments, the automatic generation of upgrade requests is based on the presence of keywords within a manual image review. For example, certain review specialties are associated with lists of keywords. In some embodiments, when one of these keywords are received in a manual image review and an automated review upgrade is initiated. The review upgrade preferably includes a human image reviewer having a specialty associated with the received keyword. In a specific example, one specialty includes "automobiles" and is associated with the keywords "car," "truck," "van," "convertible," and "Ford." When one of these keywords is received in a manual image review, Review Logic 170 checks with Review Logic 157 to determine if a human image reviewer having a specialty in "automobiles" is currently active. If so, then an automatic upgrade is initiated and the image is sent to the Destination 125B of the reviewer having the "automobiles" specialty.

If no upgrade requests are made, then in an End Step 490, the process is completed.

Figure 5:
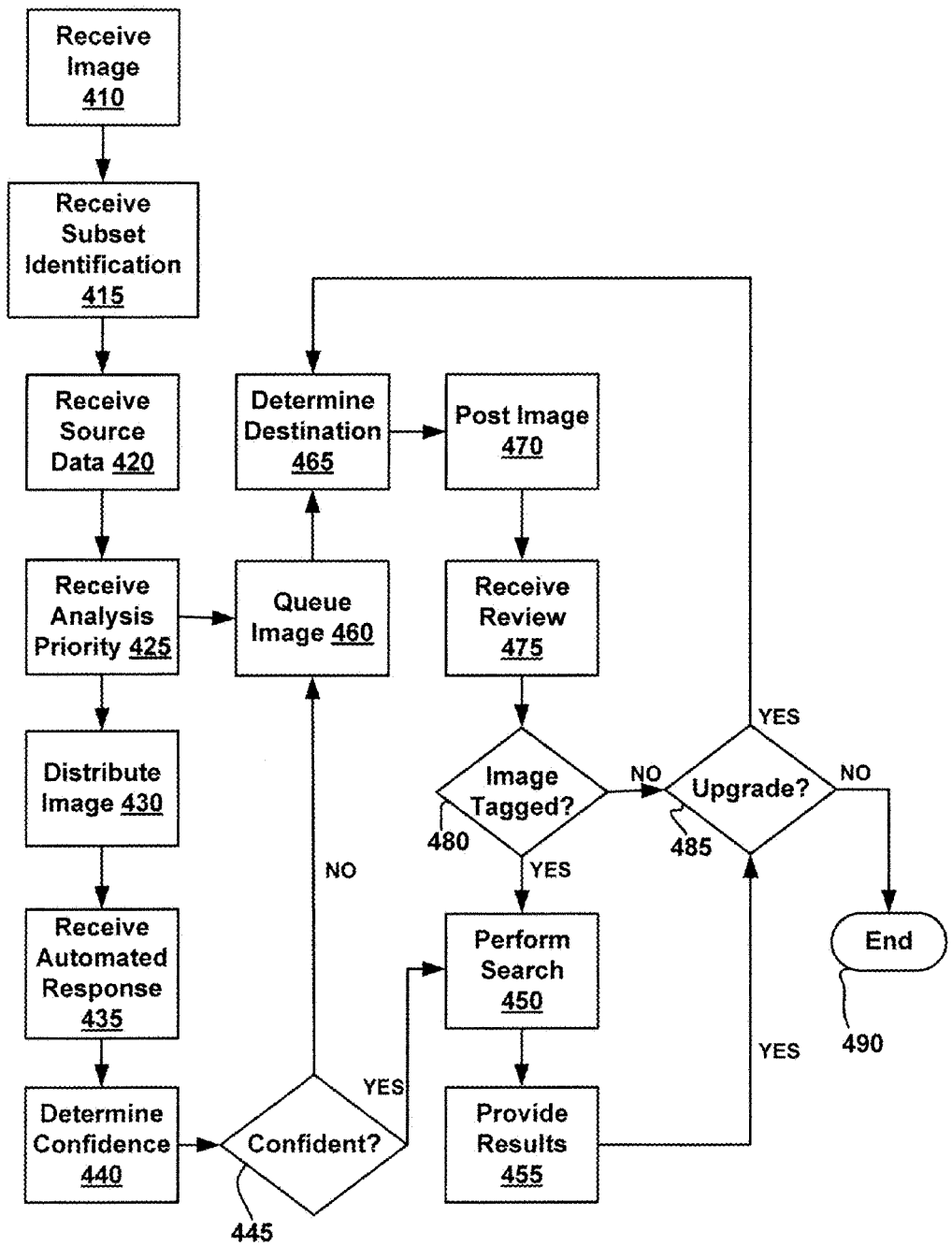
FIG. 5 illustrates alternative methods of processing an image, according to various embodiments of the invention.

FIG. 5 illustrates alternative methods of processing an image, according to various embodiments of the invention. In these methods, at least some of Steps 430-445 are performed in parallel with at least some of Steps 460-475. The manual image review is in Steps 460-475 may be begun before the computer generated review of Steps 430-445 is complete, thus, the manual image review is started before the confidence measure of the computer generated review is known. If, in Confident? Step 445, the confidence measure is found to be above the predetermined threshold(s), then Steps 460-475 are optionally aborted.

FIG. 6 illustrates methods of managing a reviewer pool, according to various embodiments of the invention. In this method the status of a reviewer may be changed based on their performance in reviewing images. The steps illustrated may be part of and performed in concert with the methods illustrated by FIGS. 4 and 5. For example, they may be performed in part between Receive Image Step 410 and Receive Review Step 475. The methods illustrated include sending an image to more than one of Destinations 125.

In Receive Image Step 410 an image is received. As is discussed elsewhere herein, the image may be received at Image Processing system 110 via Network 115. The image may be generated by a camera and/or obtained from a webpage. In some embodiments, the image is received along with information about how often the web page is viewed.

In a Select $1^{st}$ destination Step 610 a first destination is selected for manual or automated analysis of the image. Select $1^{st}$ Destination Step 610 is performed using Destination Logic 160 and is an embodiment of Determine Destination Step 465. As described elsewhere herein, the determination of a destination for the image may be based on a wide variety of factors, including the status of a human reviewer and scores associated with reviewers. For example, typically a member of Destinations 125 associated with an active reviewer will be selected, rather than one without an active reviewer. The selected destination may be a member of Destinations 125 and/or Automatic Identification System 152.

In Post Image Step 470, the image received in Receive Image Step 410 is posted to the selected member of Destinations 125. As discussed elsewhere herein, posting of the image can include communicating the image via Network 115 using standard network protocols such as TCP or UDP.

In an optional Monitor Step 620, Reviewer Logic 170 is used to monitor progress of a manual image review of the image at the member of Destinations 125 selected in Select $1^{st}$ Destination Step 610. The monitoring can include detection of input by a human reviewer, time taken for the image review, a number of words provided that characterize the image, and/or the like. Monitoring optionally includes measuring a time to taken to tag the image. Where monitoring includes detection of input by a human reviewer, the monitoring can be on a keystroke-by-keystroke basis, on a word-by-word basis and/or on a line-by-line basis. As such, Reviewer Logic 170 may be configured to receive data characterizing the image a character, word or line at a time.

In Remove Step 630, the image is removed from processing at the member of Destinations 125 Selected in Select $1^{st}$ Destination Step 610. "Removal" can include, notifying the human reviewer at the selected member of Destinations 125 that he or she is no longer primarily responsible for reviewing the image, relieving the human reviewer of primary responsibility (without necessarily notifying the human reviewer), removing the image from a display of the human reviewer, and/or the like. In some embodiments, Remove Step 630 includes merely placing a human reviewer in a ranking to have secondary or shared responsibility for reviewing an image. For example, if the human reviewer associated with the member of Destinations 125 selected in Select $1^{st}$ Destination Step 610 had primary responsibility for reviewing an image, the responsibility may now be shared or assigned to other reviewers associated with other members of Destinations 125. In this case it is the primary responsibility that is "removed."

Remove Step 630 may occur if manual review of the image is taking too long. For example, if in Monitor Step 620 it is found that the reviewer has not started typing after a predetermined time, then Remove Step 630 may be performed. Other examples, of triggering events for Remove Step 630 include, loss of communication with the selected member of Destinations 125, exceeding a predetermined time allotment for review of the image, improper or inappropriate image tags received from the human reviewer, inaccurate (not characterizing the image) image tags received from the human reviewer, a referral from a first human reviewer to a second human reviewer, an upgrade request of the image review, and/or the like.

In a Select $2^{nd}$ Destination Step 640 a second member of Destinations 125 (or Automatic Identification System 152) is selected using Destination Logic 160. The second member may be selected based on any of the criteria discussed above with regard to Select $1^{st}$ Destination Step 610 and Determine Destination Step 465. Further, in some embodiments the selection of a second member may be based on a specific referral by a human reviewer associated with the first member of Destinations 125. For example, a first human reviewer may identify the content of an image to be a specialty of a second human reviewer and may refer the image to the member of Destinations 125 associated with the second human reviewer. The selection of a second member of Destinations 125 in Select $2^{nd}$ Destination Step 640 is optionally dependent on automated processing on an image using Automatic Identification System 152.

In another Post Image Step 470 the image is posted to the member of Destinations 125 Selected in Select $2^{nd}$ Destination Step 640. In some embodiments, more than one human reviewer may review an image in parallel. They may perform the review independently or in cooperation. One reviewer may have primary responsibility for review of the image or each reviewer may have equal responsibility. One reviewer may have supervisory responsibility over one or more other reviewers. In some embodiments, Select $2^{nd}$ Destination step 640 is performed and the image is posted to two or more members of Destinations 125 prior to Monitor Step 620 and/or Remove Step 630.

In Receive Review Step 475 a review of the image, e.g., image tags, is received as discussed elsewhere herein. The review typically includes image tags characterizing contents of the image. Reviews may be received from more than one of Destinations 125. For example, tags characterizing an image may be received from the members of Destinations 125 selected in both Select $1^{st}$ Destination Step 610 and Select $2^{nd}$ Destination Step 640. Receive Review Step 475 is optionally performed in real-time as characters or words are provided by human reviewer(s).

In an optional Associate Tags Step 650, one or more image tags characterizing the image are stored in association with the image. The stored tags optionally include tags provided by more than one human reviewer and may be stored in Memory 135. As described elsewhere herein, the tags may further be provided to a member of Image Sources 120 (e.g., in an embodiment of Provide Results Step 455) or used to select advertisements using Advertising System 180. The tags may also be provided to Automatic Identification System 152 to provide training of automatic image recognition processes.

FIG. 7 illustrates methods of receiving image tags in real-time, according to various embodiments of the invention. These methods are optionally performed by Image Processing System 110 and the image tags may be a result of a manual image review. These methods may be performed in concert with the other methods described herein, for example as part of the methods illustrated by FIG. 4. The methods begin with Post Image Step 470 in which an image is provided to one or more members of Destinations 125, as discussed elsewhere herein. The methods illustrated in FIG. 7 are optionally preceded by Receive Image Step 410 in which an image is received from a remote computing device.

In a Receive Input Step 710 input is received from the one or more members of Destinations 125. This input typically includes characters provided by a human reviewer. For example, the input may be characters typed by a human reviewer at Destination 125A. Typically, Receive Image Step 710 is continued as other steps shown in FIG. 7 are performed.

In a Detect $1^{st}$ Word Step 720 a word is detected in the input received in Receive Input Step 710. The word may be detected by the presence of a whitespace character such as an ASCII space or carriage return. Spell checking is optionally performed on the detected word. If the word is not include in a spellcheck dictionary, then an attempt at correction may be made or the human reviewer may be notified of the failure to recognize the word.

Detection of the word in Detect $1^{st}$ Word Step 720 results in execution of a Deliver $1^{st}$ Word Step 730 in which the word is communicated to a source of the image. For example, once a word is detected it may be provided to Image Source 120A in real-time. At Image Source 120A the word can be displayed to a user. Displaying one word at a time can provide an impression that the analysis of the image is occurring in a shorter amount of time, as compared to waiting until an entire set of image tags are received before displaying the set.

In a Detect $2^{nd}$ Word Step 740 a second word is detected in the input received in Receive Input Step 710. Again, the word may be detected by the presence of a whitespace character and can occur after providing the first word to the user at Image Source 120A. Both the first and second words are expected to be tags characterizing the image. Detection of the second word in Detect $2^{nd}$ Word Step 740 triggers a Deliver $2^{nd}$ Word Step 750 in which the second word is delivered to the image source, e.g., Image Source 120A. Detect $2^{nd}$ Word Step 740 and Deliver $2^{nd}$ Word 750 may be repeated for third, fourth and additional word, each being part of the image tags.

In a Detect Completion Step 760 data indicating that processing of the image is completed, e.g., that the words detected comprise all the words (image tags) to be provided by the human reviewer are received. The data may include a metadata tag such as "/endtags," an ASCII carriage return, and/or the like. Typically, Detect Completion Step 760 occurs after one, two or more image tags have been received. In optional Associate Tags Step 650 the received image tags are associated and/or stored with the image as discussed elsewhere herein.

While FIG. 7 illustrates detection and delivery of a word at a time, in alternative embodiments, individual keystrokes are detected and delivered. Receive Input Step 710 may continue in parallel with Steps 720-740 and/or 750. Steps 710-760 may be include as part of Receive Review Step 475, discussed elsewhere herein.

FIG. 8 illustrates methods of upgrading an image review, according to various embodiments of the invention. In these methods an image receives more than one phase of image review. Following a first review (phase 1) the image review is upgraded and reviewed further (phase 2). The request for upgrade can be automatically generated, initiated by a first human reviewer, and/or be in response to a request from a source of the image. Both the first and second review may be manual, i.e., performed by a human reviewer. Alternatively, the first review may be automatic and one or more subsequent reviews may be manual, or the first review may be manual and one or more subsequent reviews automatic.

In Receive Image Step 410 an image is received. A first member of Destinations 125 is selected for the image in Select $1^{st}$ Destination Step 610. The image is then posted in Post Image Step 470. These steps are discussed elsewhere herein.

In a Receive $1^{st}$ Review Step 810 a first review of the image is received. This first review may include one or more image tags characterizing the contents of the image. For example, the image review may include words "black spider" in response to a picture including an image of a black spider; or the image may include the words "red car" in response to an image including a red automobile. Receive $1^{st}$ Review Step is optionally an embodiment of Receive Review Step 475, and may include the real-time communication of image tags as discussed in regard to FIG. 7.

In some embodiments, the first review can include an indication, provided by the human reviewer that performed the first image review, that the processing of the image should be upgraded. For example, the first human reviewer may manually indicate a field of expertise for a second (optionally specialized) human reviewer. For example, a first human reviewer may provide the "red car" image tags and suggest an upgraded review be performed by a reviewer with automotive expertise. Alternatively, the first review can include image tags that are considered particularly valuable. For example, an automatic review that indicates a 72% probability that the image includes a wedding dress may trigger an automated upgrade to a manual review because the image tags "wedding dress" are potentially of greater commercial value than other image tags. In some embodiments, this automated upgrade is performed by Review Logic 170 and is based on a list if relatively important or valuable keywords stored in Memory 135. This list can include keywords and an associated measure of their value. As discussed elsewhere herein, automatic upgrades performed by Review Logic 170 are optionally based on image tags automatically generated using Automatic Identification System 152 and/or information predictive of how often an image will be viewed. These factors are optionally applied using an algorithm that maximizes the potential value of tagging the image using a human reviewer and providing advertisements based on these tags. Examples of more valuable image tags may be related to shoes, cars, jewelry, travel destinations, books, games, clothing, holidays, food, drink, real estate, banks, accidents, etc.

In some embodiments, upgrades of image reviews are automatic. For example, a tag of "black spider" may automatically result in an upgrade of the image review that includes sending the image to a human reviewer having a particular specialty, e.g., a spider expert. The identification of particular plant or animal life often includes (depends on) location information, as the location of the plant or animal can be important for proper identification.

In some embodiments, as discussed elsewhere herein, upgraded reviews may be requested by the person who originally requested that the image be reviewed. For example, a user of Image Source 120A may provide an image of a dog and received image tags comprising "black dog." The user may then request further detail by providing the word "breed?" In this case the image review may be upgraded and sent to a human reviewer with specific knowledge of dog breeds. In some embodiments, the user is charged for the upgrade or is required to have a premium account in order to request upgrades. The user may specify a particular part of an image when requesting an image review upgrade.

The presence of an upgrade request (automatically and/or manually generated) is detected in a Detect Upgrade Request Step 820. The detection may be based on data or a command received from a member of Image Sources 120, from a member of Destinations 125, Automatic Identification Interface 150, and/or from a component of Image Processing System 110 such as Review Logic 170, Content Processing Logic 185 or Response Logic 175.

In a Select $2^{nd}$ Destination Step 640, Destination Logic 160 is used to select a second member of Destinations 125 and/or Automated Identification System 152 for review of the image. This selection can be based on any of the criteria on which Select $1^{st}$ Destination Step 610 was based and, in addition, the image tags and/or other information resulting from the first review. For example, the selection of a second member of Destinations 125 may be based, at least in part, on an image tag manually or automatically generated in the first image review. Specifically, a tag of "black spider" may be used by Destination Logic 160 to select a member of Destinations 125 associated with a human reviewer having expertise in the identification of spiders. In another example, selection of a second member of Destinations 125 may be based on a word provided by a user requesting the image review. Specifically, if the first review produces image tags "white shoe" and the user responds with "brand?" then Destination Logic 160 may use this information to select a member of Destinations 125 associated with a human reviewer having expertise in shoe brands.

In some embodiments of Select 2$^{nd}$ Destination Step 640, Destination Logic 160 is configured to possibly select Automatic Identification System 152 for the second review of the image, rather than a member of Destinations 125. This may occur, for example, when the image has been tagged with the name of an actor and the upgrade request requests "movie name?" In such a case, the image may be searched for in a library of move images. The same approach may be taken for other reproducible objects such as currency, paintings, car models, trademarks, barcodes, QR codes, well known persons, etc.

In another instance of Post Image Step 470 the image is posted to the second selected member of Destinations 125 or Automatic Identification System 152 for a second review of the image. In a Receive 2$^{nd}$ Review Step 830, image tags characterizing the content of the image are typically received. Receive 2$^{nd}$ Review Step 830 is optionally an embodiment of Receive Review Step 475. Alternatively, an additional referral, indication that the image cannot be tagged for some reason or other information may be received. The image tags are received from the member of Destinations 125 or Automatic Identification System 152 to which the image was posted. Steps 820, 640, 470 and 830 may be repeated if needed.

In Associate Tags Step 650 received image tags are associated with the image and/or provided to the source of the image, as discussed elsewhere herein.

In one illustrative example of the methods illustrated by FIG. 8 an image is received from a web page. The image is sent to Automatic Identification System 152 for automated review. The result of the automated review includes an image tag "ring." This tag is processed using Review Logic 170 and identified as a potentially valuable image for use in advertising. As discussed elsewhere herein, this identification is optionally also based on other factors such as how often the image is viewed on the web page. As a result of the identification, the review of the image is automatically upgraded and sent to a member of Destinations 125 that is associated with a human reviewer having expertise in Jewelry. The human reviewer modifies the image tags to include "gold wedding ring" and these tags are associated with the image. These image tags may then be used to select advertisements using the systems and methods described elsewhere herein.

In one illustrative example of the method illustrated by FIG. 8 an image is received from an application executing on a mobile device. The image includes a scene of a street and is sent to Destination 125A for review by a human reviewer. The human reviewer response with image tags "street scene" and these tags are provided to the mobile device. A request for a review upgrade is then received from the mobile device. This request includes the text "car model?" and an identification of part of the image including a car. As a result of this request the image, text and identification are sent to Destination 125A or another member of Destinations 125 for further manual review. The further review results in the image tags "1909 Model-T" which are then forwarded to the mobile device.

In one illustrative example of the method illustrated by FIG. 8 an image is received from a computing device. The image includes several pieces of paper currency laying on a plate and is sent to Destination 125A for manual review. The resulting tags include "US currency on white plate" and are sent to the computing device. A request for an image review upgrade is received. The request includes "how much?" As a result of this request the image is sent to Automatic Identification System 152 where automated currency identification logic is used to identify the amounts of the currency and optionally provides a sum. This information is then sent back to the computing device.

In one illustrative example of the method illustrated by FIG. 8 an image is received from a mobile device. The image includes a leaf of a plant and is sent to Destination 125A. The human reviewer at Destination 125A provides the image tags "green leaf" and also upgrades the image review. As a result of the upgrade and the image tags the image is sent to Destination 125B, which is associated with a second human image reviewer having expertise in botany. The selection of Destination 125B is based, in part on the image tags "green leaf." In parallel, the image tags "green leaf" are sent to the mobile device. At Destination 125B the second human image reviewer adds the words (tags) "poison ivy" to the already existing image tags. These additional tags are then also sent to the mobile device. On the mobile device the words "green leaf" are first displayed and then the words "poison ivy" are added to the display once available.

The methods illustrated by FIG. 8 are optionally used in concert with other methods described herein. For example, the image tags may be used in Auction Tag Step 1560 described elsewhere herein. The tags may be used to select an advertisement and the advertisement provided to a remote browser for display on a webpage along with the image.

Figure 9:
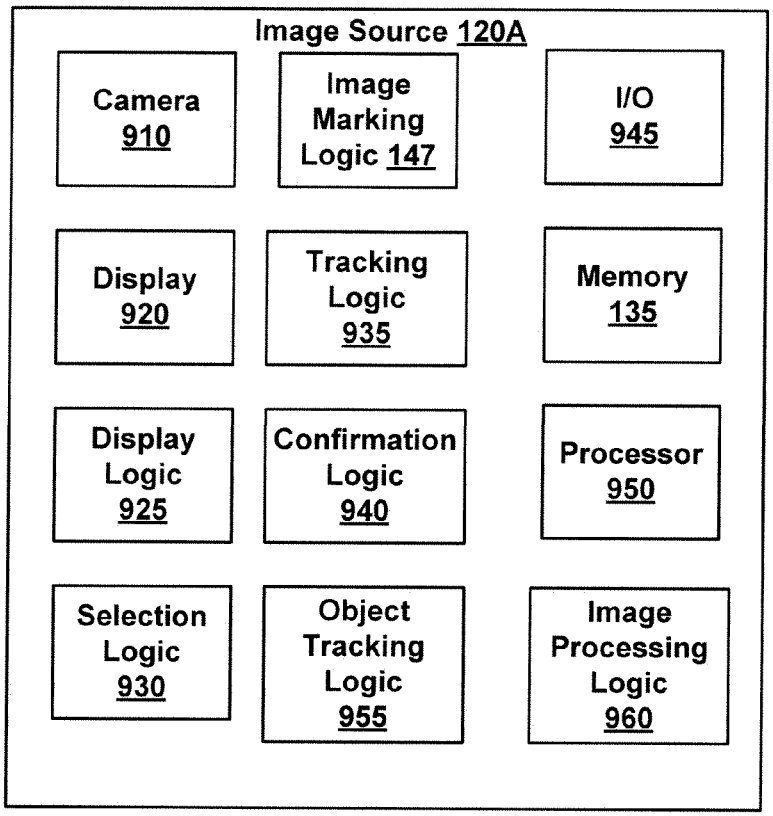
FIG. 9 illustrates an example of Image Source 120A including electronic glasses, according to various embodiments of the invention.

FIG. 9 illustrates an example of Image Source 120A including electronic glasses, according to various embodiments of the invention. Electronic glasses include glasses to be worn by a person. Examples include "Google Glass" by Google®, "M100 Smart Glasses" by Vuzix®, the iOptik™ contact lens by Innovega, and/or the like. These systems are configured to allow a user to view both the real world and an electronic display at the same time. Electronic glasses may also include virtual reality systems such as the Oculus Rift™ by Oculus VR. These types of systems display images to a user using an electronic display, but do not provide simultaneous direct view of the real world. A direct view is a view that is not digitized for viewing, e.g., a view through a glass or lens.

Generally, electronic glasses provide in interactive interface in which a user can select a subset of the image in real-time as the image is being viewed in or through the electronic glasses. As used herein, "real-time" selection is meant to mean that the image is being viewed as it is being captured, with only inconsequential delay. For example, an image viewed in real-time may be captured by a camera and processed using a graphics engine and displayed with only a delay resulting from electronic processing times. Real-time viewing allows the user to position objects of interest within the viewed image by moving the image capture device as the image is being viewed. Thus, real time viewing excludes viewing of images that have been stored for substantial periods before viewing.

As illustrated in FIG. 9, Image Source 120A includes a Camera 910 configured to capture images. The captured images can include still images or video comprising a sequence of images. A Display 920 is configured to present the captured images to a user of Camera 910. In some embodiments, such as those in which Image Source 120A is a smart phone, Display 920 includes a touch screen configured to function as a view finder for Camera 910, to display captured images and to display Image Capture Screen 210

(described elsewhere herein). Display Logic 925 is configured to manage the display of images and other content on Display 920. Display Logic 925 can include hardware, firmware and or software stored on a computer readable medium In the embodiments illustrated by FIG. 9, Image Source 120A further comprises Selection Logic 930 configured for the user of Image Source 120 to indicate a subset of a captured image. This indication can be made within Image Capture Screen 210 in real-time as the image is being displayed and/or captured on Display 920. As discussed elsewhere herein, such an indication is made to select a particular object of interest within the image. Following selection, the subset of the image is optionally marked using Image Marking Logic 147 as discussed elsewhere herein. Image Marking Logic 147 may be used add a mark to the image as shown within Display 920. As such, the user can see the location that has been marked. Selection Logic 930 is optionally configured for the user to remark the subset of the image until the user is satisfied with the selection.

In some embodiments, Selection Logic 930 includes Tracking Logic 935 configured to track movement of the user's eyes. Tracking Logic 935 is optionally included within electronic glasses. Eye tracking can include detection of the focal point of both eyes, the direction of one or more eyes (eyeball direction), the focus of one or more eyes, blinking, eyeball movement, and/or the like. Tracking Logic 935 is optionally configured to correlate a state of the user's eyes with a location within captured images. Geometry data representing a geometric relation between Camera 910 and the physical elements of Selection Logic 930 are used to associate the state of the user's eyes with the location within an image captured using Camera 910.

Tracking Logic 935 optionally includes a second camera directed at the eyes of the user. This camera may be mounted on electronic glasses or be part of other embodiments of Image Sources 120. For example, Tracking Logic 935 configured for tracking a user's eyes may be included in a web camera, a smartphone, a computer monitor, a television, a tablet computer, and/or the like.

In some embodiments, Tracking Logic 935 is configured to detect blinking of one or more eyes. For example, Tracking logic 935 may be configured to detect a single eye blink or a pattern of eye blinks. When such an event is detected, Selection Logic 930 may select a position within an image based on eye position data received from Tracking Logic 935, or alternatively select a position at the center of the currently viewed image.

Once an image has been marked using Marking Logic 147 and Selection Logic 930, the location and/or area of the marking can be displayed to the user on the marked image within Display 920. For example, the image, plus a red "X" at the marked location, may be displayed to the user within Image Capture Screen 210. In some embodiments, the user may then confirm the selection using Confirmation Logic 940. Confirmation Logic 940 is optionally responsive to Tracking Logic 935. For example, confirmation may be provided using a blink or other eye movement, an audio command, a verbal command, or a touch command. In some embodiments, Tracking Logic 935 is configured to detect, and interpret as a command, movement of the eyes into an unnatural position (e.g., cross-eyed). Such a movement can be used to provide a confirmation command. Confirmation is optionally required prior to sending the image to Network 115.

In some embodiments, Selection Logic 930 includes Tracking Logic 935 that is configured to track something other than or in addition to the eyes. For example, Tracking Logic 335 may be configured to detect a pointing finger of a user, an electronic device worn on a finger or wrist, and or the like. In these embodiments, Selection Logic 930 is configured to infer a location within an image based on the detected object. In one embodiment, Tracking Logic 935 is configured to detect the location of a pointing finger within an image and infer that the location to be selected is at the tip of the finger. A user can point to an object within their field of view, provide an audio, eye based, and/or touch based command to Image Source 120A, and the position of the pointing finger will be used to make the selection of a position within the image. In one embodiment, Tracking Logic 935 is configured to detect the location of a wireless electronic device relative to Image Source 120A and infer that the location to be selected is along a line between the wireless electronic device and a part of Image Source 120A.

Image Source 120A further includes an I/O 945 configured for Image Source 120A to communicate to Image Processing System 110 via Network 115. I/O 945 can include wired and/or wireless connections. For example, in some embodiments, I/O is configured to communicate wirelessly from electronic glasses to a cellular phone using a Bluetooth™ connection and then for the communication to be forwarded from the cellular phone to Network 115 using Wifi or a cellular service.

Image Source 120 further includes an embodiment of Memory 135 configured to store images captured using Camera 910, geometric data, account data, and/or the like. Memory 135 includes non-transient memory such as Random Access Memory (RAM) or Read Only Memory (ROM). Memory 135 typically includes data structures configured to store captured images and marking locations within these images.

Image Source 120 further includes a Processor 950. Processor 950 is a digital processor configured to execute computing instructions. For example, in some embodiments Processor 950 is encoded with computing instructions to execute Display Logic 925, Selection Logic 930, Image Marking Logic 147 and/or Tracking Logic 935. Processor 950 optionally includes an Application Specific Integrated Circuit (ASIC) or Programmable Logic Array. (PLA).

Image Source 120 optionally further includes Object Tracking Logic 955. Object Tracking Logic 955 is configured to track movement of an object of interest within a sequence of images. For example, in some embodiments, a user may use Selection Logic 930 to select a subset of an image or an aspect of the image for which information is requested. This subset may include one or more pixels. Object Tracking logic 955 is configured to use automatic (computer based) image interpretation logic to identify a specific object occupying the selected subset. This object may be a person, a vehicle, an animal, or any other object. The boundaries or other pixels of the selected object are optionally highlighted in Display 920 by Object Tracking Logic 955. This highlight can track the object as it moves within the sequence of images and can include changing pixel characteristics. The highlighting optionally moves with the object on the display. An aspect of the image may be a brand of an object within the image, a movie from which the image is obtained, a location of the content of an image, etc. In some embodiments, aspects of the images can be specified as being of interest using text such as "shoe brand?," "movie?," "actor?," "location," "breed?," etc. Such specifications may be provided in an original request to tag an image and/or in an upgrade request.

In some embodiments, images communicated from Image Sources 120 to Image Processing System 100 are part of a sequence of images that comprise a short video sequence. These video sequences may be tagged using the systems and methods described elsewhere herein. One advantage of tagging a video sequence is that the tag(s) may characterize a specific action that occurs in the video. For example, tags of a figure skater may characterize specific jumps (double Lutz, etc.) that are better identified in video than in a still image. Various embodiments include a specific limit on the length of the image sequence, e.g., the video must be no more than 3, 5, 7 or 10 seconds.

While the embodiments illustrated by FIG. 9 include electronic glasses, these embodiments may be adapted to any device having eye tracking technology including cell phones, video display monitors (e.g., computers or television screens), tablet computers, advertising displays, etc. For example, the embodiments of Image Source 120A illustrated in FIG. 9 include a television having an eye tracking camera configured to determine at which part of a television screen a user is looking.

Image Source 120A optionally further includes Image Processing Logic 960 configured to perform one or more steps for the purpose of tagging an image. Image Processing Logic 960 is optionally configured to reduce the load on Image Processing System 110 by performing these one or more steps locally to Image Source 120A. For example, Image Processing Logic 960 may be configured for performing initial steps in tagging of an image and then send the results of these initial steps to Image Processing System 110 for generation of image tags. In some embodiments, Image Processing Logic 960 is capable of completing the tagging process for some but not necessarily all images. Image Processing Logic 960 includes hardware, firmware and/or software stored on computer readable media. For example, some embodiments include an instance of Processor 950 specifically configured to perform the functions of Image Processing Logic 960 discussed herein.

In some embodiments, Image Processing System 110 is configured to provide Image Processing Logic 960 to Image Sources 120. This is optionally via an "app store" such as the Apple App Store. Where applicable, Providing Image Processing Logic 960 to a member of Image Sources 120 is an optional step in the various methods illustrated herein. Processing Logic 960 can be provided as an "app" or computer instructions that further includes other logic discussed herein, for example the logic discussed in relation to FIG. 9.

In some embodiments, Image Processing Logic 960 is configured to identify specific features within an image. Feature identification includes determining if specific points within an image are or are not part of a feature of a given type. Types of features include, but are not limited to, edges, corners, blobs and ridges. Generally, a feature is an "interesting" or "useful" part of an image, for the purpose of identifying contents of the image. Image Processing Logic 960 may be configured to perform one or more of a number of different feature detection algorithms. In some embodiments, Image Processing Logic 960 is configured to select from among a number of different algorithms based on available processing power and/or contents of the image. Examples of known feature detection algorithms include "Canny," "Sobel," "Harris & Stephens/Plessy," "SUSAN," "Shi & Tomasi," "Level curve curvature," FAST," "Laplacian of Gaussian," "Difference of Gaussians," "Determinant of Hessian," "MSER," "PCBR" and Grey-level blobs." These types of algorithms are executed on a computing device and other such algorithms will be apparent to one of ordinary skill in the art. The results of feature identification include identification of a specific feature type at a specific location within the image. This may be encoded in a "feature descriptor" or "feature vector," etc. The results of feature detection may also include a value representing a confidence level at which the feature is identified.

In some embodiments, Image Processing Logic 960 is further configured to calculate image descriptors based on identified image features. Image descriptors are visual features of the contents of an image and include characteristics such as shape, color, texture and motion (in video). Image descriptors may be part of a specific descriptor domain, such as descriptors related to the domains of face recognition or currency recognition. The derivation of image descriptors is typically based on image features. For example, derivation of a 3-D shape descriptor may be based on detected edge features. Image descriptors may characterize one or more identified objects within an image.

The particular image features and image descriptors used in a particular embodiment are dependent on the particular image recognition algorithms used. A large number of image recognition algorithms are known in the art. In some embodiments, Image Processing Logic 960 and/or Image Processing System 110 are configured to first attempt identification of image features and derivation of image descriptors of various types and then to select from among a plurality of alternative image processing algorithms based on the levels of confidence at which the image descriptors are derived. For example, if image descriptors in a facial recognition domain are derived with a high level of confidence, then an image processing algorithm specific to facial recognition may be selected to generate image tags from these image descriptors.

In those embodiments that include Image Processing Logic 960 the task of tagging an image can be distributed between Image Sources 120 and Image Processing System 110. How the task is distributed may be fixed or may be dynamic. In embodiments were the distribution is fixed specific steps are performed consistently on specific devices. In embodiments were the distribution is dynamic the distribution of steps may be responsive to, for example, communication bandwidth, image type (still or video) processing power on Image Source 120A, current load on Image Processing System 110, availability of image reviewers at Destinations 125, the confidence to which steps are accomplished on Image Source 120, and/or image descriptor data present on Image Source 120A. Any combination of these factors may be used to dynamically allocate distribution of processing steps. For example, if the derivation of image descriptors occurs with a low degree of confidence (relative to a predetermined requirement) on Image Source 120A, then the image features and/or image maybe communicated to Image Processing System 110 for derivation of image descriptors using more powerful or alternative image processing algorithms. In contrast, if the derivation of image descriptors occurs on Image Source 120A with an adequate degree of confidence, then this step need not typically be performed on Image Processing System 110.

If image processing steps are successfully performed on Image Source 120A by Image Processing Logic 960, the results of these steps and/or the image may be communicated to Image Processing System 110 using I/O 945. For example, in some embodiments both an image and image descriptors are communicated to Image Processing System 110. The image descriptors may be used in an attempt to automatically tag the image or may be provided to a human image reviewer at one or more of Destinations 125. The image descriptors may be used to identify a descriptor domain and this domain then used to select a member of Destinations 125 to which the image is sent. For example, a descriptor domain of "vehicles" may be used to select an image review having expertise in vehicles. The classification of an image into a domain based on image descriptors may occur on either Image Processing System 110 or Image Processing Logic 960.

In some embodiments automatic tagging of an image is attempted based on derived image descriptors. In various embodiments, this may occur using Image Processing Logic 960 and/or Automatic Identification System 152. Classification optionally occurs by comparing the image descriptors derived from the image with a library of image descriptors associated with different classes. For example, an image descriptor identifying a vehicle shape may match with a previously stored image descriptor associated with a "vehicle" class. If the class is suitable (in type, scope, etc.) the identification of a class may be sufficient to automatically select a tag for the image. For example, image descriptors matching those of a class "child face" may be sufficient to generate the tags "child's face."

Typically, Image Processing System 110 includes a larger library of image descriptors associated with different classes relative to Image Source 120A. These libraries are optionally stored in Memory 135 of Image Processing System 110 or Image Source 120A, or Automatic Identification System 152. Libraries of image descriptors stored in Image Source 120A are optionally based on images previously processed using Image Source 120A. For example, if several images from Image Source 120A are identified as having descriptors and tags relating to currency, a library of descriptors in the currency domain/class may be stored in Memory 135 of Image Source 120A. These descriptors may be associated with tags such as "US $5 bill." When a new age is received having the same set of descriptors, Image Processing Logic 960 is optionally configured to automatically tag the image using the associated tags. While the descriptor library may be received from Image Processing System 110, or may be developed using image tags received from Image Processing System 110, the tagging in the above example is not dependent on real-time communication with Image Processing System 110.

In various embodiments, data characterizing relationships between image descriptors and classes and/or tags may be developed on Image Processing System 110, Image Source 120A, Destination 125A and/or Automatic Identification System 152. Once developed the data may be transferred to improve and/or supplement the libraries at any of the other devices.

Will the systems illustrated show a client-server architecture, in alternative embodiments Image Sources 120 and Destinations 125 are connected in a peer-to-peer architecture. In these embodiments, any combination of the elements illustrated in Image Processing System 110 may be included in Image Sources 120 and/or Destinations 125. One of Image Sources 120 may perform the image tagging and processing tasks discussed herein on an image received from another of Image Sources 120.

Figure 10:
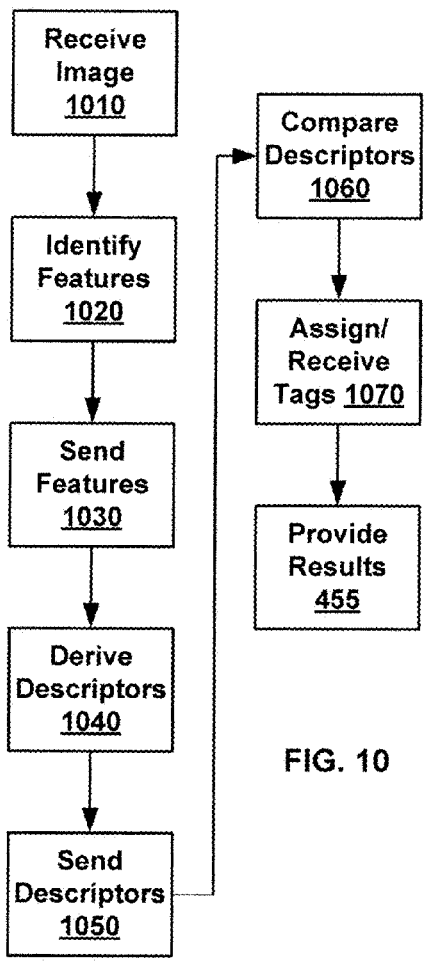
FIG. 10 illustrates a method of processing an image on an image source, according to various embodiments of the invention.

FIG. 10 illustrates a method of processing an image at least partially on Image Source 120A, according to various embodiments of the invention. The methods illustrated by FIG. 10 can include a range of different processing steps performed on Image Source 120A. For example, those steps involving image descriptors are optionally performed on Image Processing System 110.

In a Receive Image Step 1010 and image is received by Image Source 120A. The image may be received from a camera included in Image Source 120A, from Image Source 120B, from Network 115, from Image Processing System 110, from a wireless device, from a memory device, and/or the like. The received image is optionally one of a sequence of images that form a video.

In an Identify Features Step 1020, Image Processing Logic 960 is used to identify image features within the received image. As discussed elsewhere herein, methods of identifying image features are known in the art. Identify Features Step 1020 may apply one, two or more of these methods. The identification of features optionally includes a confidence level reflecting an estimated accuracy and/or completeness of the feature identification.

In an optional Send Features Step 1030 the image features identified in Identify Features Step 1020 are sent to Image Processing System 110. The features may be sent with or without the associated image and may be sent via Network 115. If Send Features Step 1030 is included in the method, the method optionally next proceeds to a Generate/Receive Tags Step 1070 in which Tags for the image are received from Image Processing System 110. Image Processing Logic 960 is optionally configured to perform Send Features Step 1030 based on a confidence level of the features calculated in Identify Features Step 1020. For example, if the confidence is below a threshold the step may be executed and both the image and the features sent.

In an optional Derive Descriptors Step 1040 Image processing Logic 960 is used to derive image descriptors from the image features identify in Identify Features Step 1020. As discussed herein, a wide assortment of methods is known in the art for deriving image descriptors. In some embodiments, Derive Descriptors Step 1040 includes using more than one method. The derivation may include a confidence level reflecting an estimated accuracy and/or completeness of the descriptor derivation. The types and content of descriptors derived is typically dependent on the image recognition algorithm(s) used.

In an optional Send Descriptors Step 1050 the image descriptors derived in Derive Descriptors Step 1040 are sent to Image Processing System 110. The image descriptors may be sent with or without the associated image and may be sent via Network 115. If Send Descriptors Step 1050 is included in the method, the method optionally next proceeds to a Generate/Receive Tags Step 1070 in which Tags for the image are received from Image Processing System 110. Image Processing Logic 960 is optionally configured to perform Send Descriptors Step 1050 based on a confidence level of the image features derived in Derive Descriptors Step 1040. For example, if the confidence is below a threshold the step may be executed and both the image and the features sent.

In an optional Compare Descriptors Step 1060, the one or more image descriptors derived in Derive Descriptors Step 1040 are compared with one or more image descriptors stored locally. As discussed elsewhere herein, these locally stored image descriptors are associated with image classes and/or image tags. The comparison may include calculation of a characteristic reflecting the quality of the match.

In some embodiments, both Send Descriptors Step 1050 and Compare Descriptors Step 160 are performed. In this case processing of the image descriptors can occur both on Image Source 125A and Image Processing System 110. Likewise, in some embodiments both Send Features Step 1030 and Derive Descriptors Step 1040 are performed and the image features are processed on both systems/devices.

In an Assign/Receive Tags Step 1070 image tags characterizing the image are generated and/or received. For example, if the image, image features or image descriptors have been sent to Image Processing System 110, then corresponding tags may be received from Image Processing system 100 in Assign/Receive Tags Step 1070. If a match is found between the derived descriptors and the local stored descriptors in Compare Descriptors Step 1060, then tags associated to the matched locally stored image descriptors are retrieved from local memory and assigned to the image. Tags may be both locally assigned and received for the same image. The Image tags are optionally generated using image features and/or descriptors, e.g., without Image Processing System 110 receiving the actual image.

In some embodiments, Assign/Receive Tags Step 1070 includes assigning a classification to an image, sending the image and the classification to Image Processing System 110, and receiving corresponding tags back from Image Processing System 110. The tags may be identified using the methods illustrated in FIG. 4. The classification may be used by Image Processing System 100 to generate the tags using Automatic Identification system 152 and/or a human reviewer at Destination 125A.

The assigned and/or receive tags, and/or other results, are provided in Provide Results Step 455, as discussed elsewhere herein.

Figure 11:
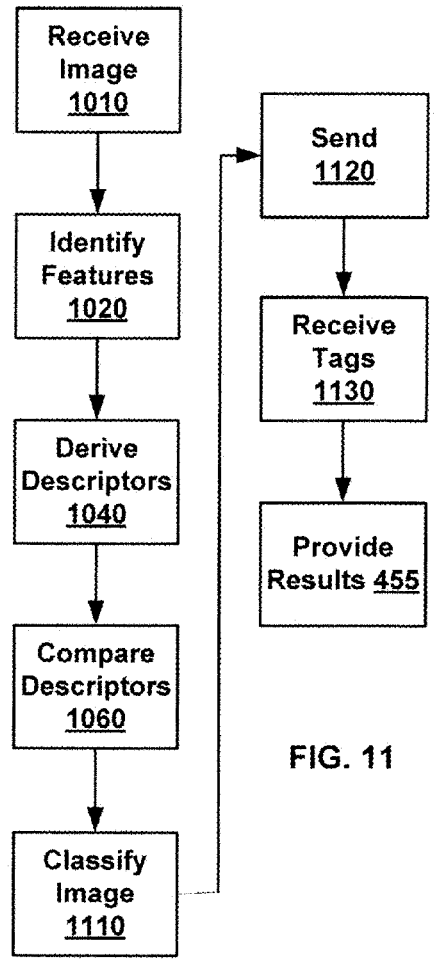
FIG. 11 illustrates a method of processing an image based on image descriptors, according to various embodiments of the invention.

FIG. 11 illustrates a method of processing an image based on image descriptors, according to various embodiments of the invention. This method is typically performed on one of Image Sources 120. In the illustrated embodiments, Steps 1010, 1020, 1040 and 1060 are performed as described elsewhere herein. In a Classify Image Step 1110 the image being processed is classified based on a match between one or more image descriptors derived in Derive Descriptors Step 1040 and image descriptors previously stored on the one of Image Sources 120. The class or classes assigned to the image is the class or classes associated with the matched image descriptors previously stored.

In a Send Step 1120 the image and the class or classes assigned to the image are sent to Image Processing System 110. The image is there processed as described elsewhere herein to produce image tags assigned to the image. The processing optionally includes use of the class or classes to select a human image review or to assist in automatically tagging the image.

In a Receive Tags Step 1130 the tags assigned to the image are received by the one of Image Sources 120 on which Receive Image Step 1010 was performed. The tags are then presented in Provide Results Step 455.

Figure 12:
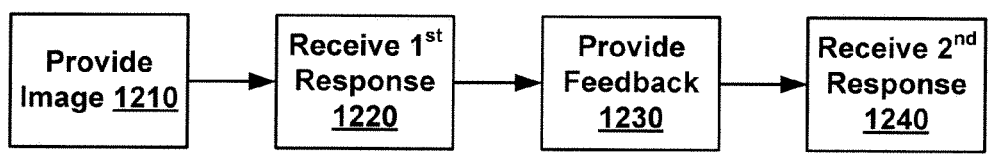
FIG. 12 illustrates a method of processing an image using feedback, according to various embodiments of the invention.

FIG. 12 illustrates a method of processing an image using feedback, according to various embodiments of the invention. This method is optionally performed on Image Source 120A and includes several communications between Image Source 120A and Image Processing System 110 in order to improve tagging of an image. In a Provide Image Step 1210, an image is provided from Image Source 120A to Image Processing System 110.

In a Receive 1$^{st}$ Response Step 1220 a first response is received from Image Processing system 110. This response may include one or more image tags. In a Provide Feedback Step 1230 feedback regarding the received image tags is provided from Image Source 120A to Image Processing System 110. This feedback is optionally manually entered by a human user of Image Source 120A and may include an upgrade request as discussed elsewhere herein. Feedback may include correction to one or more of the received tags. For example, the feedback may include an indication that one of the tags is not representative of the image. The feedback may include a classification of the image.

In an optional Receive 2$^{nd}$ Response Step 1240 a second response is received from Image Processing System 110. The second response is typically generated using the feedback provided in Provide Feedback Step 1230. In one example, considering an image of a toy car, the first response includes the tag "car", the feedback includes the term "toy" and the second response includes the tags "Fisher-Price Superwagon." The methods illustrated by FIG. 12 are optionally used to improve the accuracy of image tagging.

Figure 13:
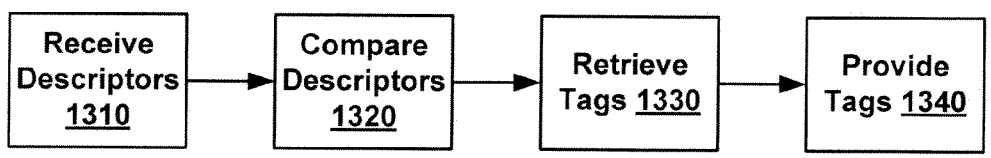
FIGS. 13 and 14 illustrates methods of providing image tags based on image descriptors, according to various embodiments of the invention.
Figure 14:
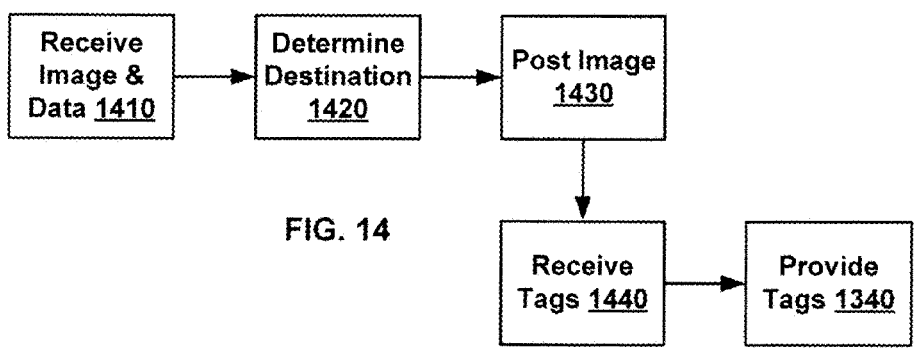

FIGS. 13 and 14 illustrates methods of providing image tags based on image descriptors, according to various embodiments of the invention. In FIG. 13 the image descriptors are used to generate image tags that are then communicated over a computing network to a source of the image descriptors. In FIG. 14 the image descriptors are used to determine a Destination 125 for an image. The methods illustrated in FIGS. 13 and 14 are optionally performed in conjunction with methods illustrated elsewhere herein. For example the steps of these methods may be combined with those illustrated in FIG. 4.

Specifically, referring to FIG. 13, in a Receive Descriptors Step 1310 one or more image descriptors characterizing an image are received at Image Processing System 110. These image descriptors are optionally received without the associated image. Receiving only the descriptors typically requires less bandwidth than receiving the image. The image descriptors are optionally received from Image Source 120A via Network 115 and generated using the methods illustrated in FIG. 10 or 11.

In a Compare Descriptors Step 1320 the received image descriptors are compared to one or more image descriptors previously stored at Image Processing System 110, e.g., stored in Memory 135. This comparison is made to determine if any of the received descriptors match the stored descriptors. The stored descriptors are stored in association with one or more image tags and/or classifications. For example, one set of stored descriptors may be associated with the image tags "oak tree."

In a Retrieve Tags Step 1330 one or more image tags are retrieved responsive to a match between the received descriptors and the stored descriptors. The retrieved image tags are those associated with matched set.

In a Provide Tags Step 1340 the retrieved image tags are provided back to the source of the received descriptors, e.g., to Image Source 120A. They may there be presented to a user or otherwise processed as described elsewhere herein.

FIG. 14 illustrates methods in which an image and data characterizing the image are processed at Image Processing Server 110. In a Receive Image & Data Step 1410 the image and the data characterizing the image are received at Image Processing Server 110. The data characterizing the image can include, for example, a classification of the image or image descriptors characterizing the image. The image and characterizing data are optionally received from Image Source 125A. Receive Image & Data Step 1410 is optionally an embodiment of Receive Image Step 410 and Receive Source Data Step 420.

In a Determine Destination Step 1420 a destination for the image is determined based on the data characterizing the image. The destination may be one of Destination 125 and/or Automatic Identification System 152. For example, if the data characterizing the image includes a specific classification and the determined destination may be one of Destination 125 being associated with a human image review having expertise in that classification. Determine Destination Step 1420 is optionally an embodiment of Determine Destination Step 465.

In a Post Image Step 1430 the image, and optionally the classification, are communicated to the determined destination. In a Receive Tags Step 1440 one or more image tags are received. The image tags being based on the image and being selected to characterize the image. In a Provide Tags Step 1340 the image tags are provided to the source of the image, e.g. Image Source 125A. Post Image Step 1430 is optionally an embodiment of Post Image Step 470.

FIG. 15 illustrates methods of prioritizing image tagging, according to various embodiments of the invention. In these methods Image Ranker 190 is used to assign a priority to an image and the priority is used to determine how, if at all, the image is tagged. In Receive Image Step 410 an image is received at Image Processing System 110 as discussed elsewhere herein. The image may be from one of Image Sources 120, and may be received by crawling webpages for images. In some embodiments one or more of Image Source 120 include logic configured to crawl websites and retrieve images from these websites. Information received along with the image may include data regarding a webpage from which the image was retrieved. For example, the image may be received along with text and metadata from the webpage, data indicating how often the webpage is loaded (viewed), a URL of the webpage, and/or any other data on which image priority may be determined as discussed elsewhere herein.

In an Assign Priority Step 1520, Image Ranker 190 is used to automatically assign a priority to the received image. The priority is optionally represented by a numerical value from 1-100, by a letter grade, or the like. Priority optionally implies an (ordered) ranking of images. As described elsewhere herein, the priority may be determined based on a wide variety of factors.

In a Determine Processing Step 1530 a method of tagging (processing) the image is determined. The determination is based on the assigned priority of the image. In some embodiments, images with lowest priority are not processed (tagged) at all. The methods of tagging include automated tagging and/or manual tagging by a human reviewer, as described elsewhere herein.

In an optional Automatic Tagging Step 1540 the image is tagged using Automatic Identification System 152. Automatic Tagging Step 1540 is optional in embodiments where the method of tagging determined in Determine Processing Step 1530 does not include use of Automatic Identification System 152. Automatic Tagging Step 1540 is optionally performed prior to Assign Priority Step 1520. For example, an image may be tagged using automatic Identification System 152, and a confidence level for the automatically generated tags may then be used in Assign Priority Step 1520 to determine a priority for manual (human) tagging. If the confidence of the automatically generated tags is high then the priority for manual tagging may be set low, and if the confidence is relatively low then the priority for manual tagging may be set relatively high.

In an optional Manual Tagging Step 1550 the image is sent to one of Destinations 125 for tagging by a human reviewer. The image may be sent with tags generated using Automatic Identification System 152 and/or a variety of other information as described elsewhere herein. Manual Tagging Step 1550 may include any of the steps illustrated by FIGS. 6-8.

In an optional Auction Tag Step 1560 an advertisement is assigned to the image for display on a webpage. This webpage is optionally the webpage from which the image was obtained in Receive Image Step 410. Auction Tag Step 1560 is optionally performed in real-time as a request for the webpage is received. At that time, the tag(s) assigned to the image can be auctioned off to the party willing to provide the greatest consideration for placing an advertisement over or beside the image. Auction Tag Step 1560 is optionally performed using Advertising System 180 and the auction process may be managed by a third party, such as Google's Adsence®.

In an optional Retag Step 1570, an image is retagged. Retag Step 1570 may include an analysis of how often advertisement(s) assigned to the image are clicked as compared to an expected click rate. For example if advertisements assigned to an image based on a first tagging are not clicked on at an expected rate, then the tags may not be an optimal representation of the image. The image may be retagged in an attempt to improve the click rate of assigned advertisements. Retag Step 1570 may include any of the tagging methods disclosed herein, e.g., those methods discussed in relation to FIGS. 6-8 and 15. Retag Step 1570 may use the knowledge that the tags resulting from the first tagging were not optimal.

The methods illustrated by FIG. 15 may also be applied to image sequences, e.g., video. The image sequence may be presented in a browser or using a variety of alternative applications. For example, video may be provided to a member of Image Sources 120 from a website such as youtube.com or from streaming services such as Netflix, Comcast cable television, direct TV, Ruku or Hulu. Factors used to determine if an image within a video should be manually tagged include: how often the video is viewed and/or the estimated value of expected tags. Expected tags may be indicated by an automatic review of the image using Automated Identification System 152, dialog within the video, text accompanying the video (e.g., a description, caption or title), and/or the like. The advertisement may be a video appended at the beginning or end of the image sequence, or spliced within the image sequence. Thus, the advertisement and video can be presented together in association. The advertisement may include an overlay placed over part of the image sequence, typically a part including the tagged image.

Several embodiments are specifically illustrated and/or described herein. However, it will be appreciated that modifications and variations are covered by the above teachings and within the scope of the appended claims without departing from the spirit and intended scope thereof. For example, the images discussed herein are optionally part of a video sequence of a video. Human image reviews may provide image tags at Destinations 125 using audio input. The audio input can be converted to text in real-time using audio to text conversion logic disposed on Destinations 125 and/or Image Processing System 110. Image tags are optionally processed by spellcheck logic. As used herein, the term "Real-time" means without unnecessary delay such that a user can easily wait for completion. The systems and methods described herein are optionally used to tag audio content, such as music or dialog. This audio content may be part of a video or otherwise associated with an image. In some embodiments, audio content is automatically converted to text and this text is used to assist in manually or automatically tag an image. Text generated from audio content may be used in manners similar to those described herein for text found on a webpage including an image, to assist in tagging the image.

The embodiments discussed herein are illustrative of the present invention. As these embodiments of the present invention are described with reference to illustrations, various modifications or adaptations of the methods and or specific structures described may become apparent to those skilled in the art. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

Computing systems referred to herein, (e.g., Image Processing System 110, Images Sources 120 and Destinations 125), can comprise an integrated circuit, a microprocessor, a personal computer, a server, a distributed computing system, a communication device, a network device, or the like, and various combinations of the same. A computing system may also comprise volatile and/or non-volatile memory such as random access memory (RAM), dynamic random access memory (DRAM), static random access memory (SRAM), magnetic media, optical media, nanomedia, a hard drive, a compact disk, a digital versatile disc (DVD), and/or other devices configured for storing analog or digital information, such as in a database. The various examples of logic noted above can comprise hardware, firmware, or software stored on a computer-readable medium, or combinations thereof. A computer-readable medium, as used herein, expressly excludes paper. Computer-implemented steps of the methods noted herein can comprise a set of instructions stored on a computer-readable medium that when executed cause the computing system to perform the steps. A computing system programmed to perform particular functions pursuant to instructions from program software is a special purpose computing system for performing those particular functions. Data that is manipulated by a special purpose computing system while performing those particular functions is at least electronically saved in buffers of the computing system, physically changing the special purpose computing system from one state to the next with each change to the stored data. The logic discussed herein may include hardware, firmware and/or software stored on a computer readable medium. This logic may be implemented in an electronic device to produce a special purpose computing system.

What is claimed is:

1. An image processing system comprising:
    an I/O configured to communicate an image and image tags over a communication network;
    an image ranker configured to determine a priority for tagging the image;
    destination logic configured to determine a destination to send the image to, for a manual review of the image by a human reviewer;
    image posting logic configured to post the image to the destination;
    review logic configured to receive the manual review of the image from the destination, the manual review including one or more image tags characterizing contents of the image;
    memory configured to store the one or more image tags in a data structure;
    an automatic identification interface configured to communicate the image to an automatic identification system and to receive a computer generated review of the image from the automatic identification system, the computer generated review including one or more image tags characterizing contents of the image, the computer generated review also including a measure of confidence representative of a confidence that the one or more image tags of the computer generated review correctly characterize the contents of the image; and
    a microprocessor configured to execute at least the image ranker, wherein the image ranker is further configured to determine the priority based on the measure of confidence.

2. The system of claim 1, wherein the image ranker is further configured to determine the priority based on the one or more image tags of the computer generated review.

3. The system of claim 1, wherein the image ranker is further configured to select between sending the image to the automatic identification system or to the destination, the selection being based on the priority.

4. The system of claim 1, wherein the destination logic is further configured to determine the destination based on the priority.

5. The system of claim 1, wherein the image ranker is further configured to select between tagging the image and not tagging the image, based on the priority.

6. An image processing system comprising:
    an I/O configured to communicate an image and image tags over a communication network;
    an image ranker configured to determine a priority for tagging the image;
    destination logic configured to determine a destination to send the image to, for a manual review of the image by a human reviewer;
    image posting logic configured to post the image to the destination;
    review logic configured to receive the manual review of the image from the destination, the manual review including one or more image tags characterizing contents of the image;
    memory configured to store the one or more image tags in a data structure; and
    a microprocessor configured to execute at least the image ranker, wherein the image ranker is further configured to determine the priority based on how often a webpage including the image is viewed.

7. The system of claim 1, wherein the image ranker is further configured to determine the priority based on a type of webpage including the image.

8. The system of claim 1, wherein the image ranker is further configured to determine the priority based on how often advertisements assigned to the image are clicked.

9. An image processing system comprising:
    an I/O configured to communicate an image and image tags over a communication network;
    an image ranker configured to determine a priority for tagging the image;
    destination logic configured to determine a destination to send the image to, for a manual review of the image by a human reviewer;
    image posting logic configured to post the image to the destination;
    review logic configured to receive the manual review of the image from the destination, the manual review including one or more image tags characterizing contents of the image;
    memory configured to store the one or more image tags in a data structure; and
    a microprocessor configured to execute at least the image ranker, wherein the image ranker is further configured to determine the priority based on an identity of a source of the image.

10. The system of claim 1, wherein the image ranker is further configured to determine the priority based on text included on a same webpage as the image.

11. The system of claim 1, wherein the image ranker is further configured to determine the priority based on metadata included on a same webpage as the image.

12. The system of claim 1, wherein the image ranker is further configured to determine the priority based on a ranking of a webpage including the image.

13. The system of claim 1, wherein the image ranker is further configured to determine the priority based on a number of webpages that include the image.

14. The system of claim 1, further comprising an advertising system configured to assign advertisements to the image based on the one or more tags.

15. The system of claim 1, wherein the image posting logic is further configured to provide the image to the destination while the image is being reviewed by an automatic identification system.

16. The system of claim 1, further comprising memory configured to store images and tags representative of the images in a data structure.

17. The system of claim 1, further comprising content processing logic configured to extract the image from an image source, wherein the image source is a photo sharing website or a social networking website.

18. The system of claim 1, wherein the destination is one of a plurality of destinations each associated with a different human image reviewer.

* * * * *